(12) United States Patent
Yamaguchi et al.

(10) Patent No.: US 10,814,592 B2
(45) Date of Patent: Oct. 27, 2020

(54) INTERLAYER FOR LAMINATED GLASS AND LAMINATED GLASS

(71) Applicant: SEKISUI CHEMICAL CO., LTD., Osaka, Osaka (JP)

(72) Inventors: Kouhei Yamaguchi, Kouka (JP); Yasuyuki Izu, Kouka (JP); Isao Higuchi, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/563,523

(22) PCT Filed: Mar. 31, 2016

(86) PCT No.: PCT/JP2016/060609
§ 371 (c)(1),
(2) Date: Sep. 29, 2017

(87) PCT Pub. No.: WO2016/159210
PCT Pub. Date: Oct. 6, 2016

(65) Prior Publication Data
US 2018/0086033 A1 Mar. 29, 2018

(30) Foreign Application Priority Data

Mar. 31, 2015 (JP) .................. 2015-074428
Mar. 31, 2015 (JP) .................. 2015-074429
(Continued)

(51) Int. Cl.
*B32B 17/10* (2006.01)
*B29C 48/00* (2019.01)
(Continued)

(52) U.S. Cl.
CPC .... *B32B 17/10761* (2013.01); *B29C 48/0018* (2019.02); *B29C 48/919* (2019.02);
(Continued)

(58) Field of Classification Search
CPC ................................................ B32B 17/10761
See application file for complete search history.

(56) References Cited

U.S. PATENT DOCUMENTS 3,998,792 A * 12/1976 Hermann .......... B32B 17/10761
528/246
5,013,779 A * 5/1991 Fariss ...................... C08K 5/11
428/437
(Continued)

FOREIGN PATENT DOCUMENTS

CN         1106278 C      4/2003
CN       101646545 A      2/2010
(Continued)

OTHER PUBLICATIONS

MT of WO 2013-051454 (Year: 2013).*
(Continued)

*Primary Examiner* — Callie E Shosho
*Assistant Examiner* — John Vincent Lawler
(74) *Attorney, Agent, or Firm* — Cheng Law Group, PLLC

(57) ABSTRACT

There is provided an interlayer film for laminated glass with which protrusion of an interlayer film portion in the TD direction can be suppressed at the time of producing laminated glass. In the interlayer film for laminated glass according to the present invention, when, in the MD direction of the interlayer film, a birefringence index of the first surface part, a birefringence index of the second surface part, and a birefringence index of the center part are defined as
(Continued)

ΔnMDA, ΔnMDB, and ΔnMDC, respectively, ΔnMDA, ΔnMDB, and ΔnMDC each are $0.25 \times 10^{-3}$ or less.

19 Claims, 3 Drawing Sheets

(30) Foreign Application Priority Data

Mar. 31, 2015 (JP) ................. 2015-074430
Mar. 31, 2015 (JP) ................. 2015-074431

(51) Int. Cl.

| | |
|---|---|
| B29C 48/88 | (2019.01) |
| B29C 55/12 | (2006.01) |
| B29C 71/02 | (2006.01) |
| C08J 5/18 | (2006.01) |
| C03C 27/10 | (2006.01) |
| C08K 5/00 | (2006.01) |
| B32B 7/02 | (2019.01) |
| B32B 27/22 | (2006.01) |
| C08J 5/12 | (2006.01) |
| B29K 29/00 | (2006.01) |
| B29L 31/30 | (2006.01) |
| B60J 1/00 | (2006.01) |

(52) U.S. Cl.
CPC .............. *B29C 55/12* (2013.01); *B29C 71/02* (2013.01); *B32B 7/02* (2013.01); *B32B 17/10036* (2013.01); *B32B 17/10605* (2013.01); *B32B 17/10633* (2013.01); *B32B 17/10678* (2013.01); *B32B 27/22* (2013.01); *C03C 27/10* (2013.01); *C08J 5/18* (2013.01); *C08K 5/0016* (2013.01); *B29K 2029/14* (2013.01); *B29L 2031/3052* (2013.01); *B32B 2250/03* (2013.01); *B32B 2250/05* (2013.01); *B32B 2250/40* (2013.01); *B32B 2307/42* (2013.01); *B32B 2605/006* (2013.01); *B60J 1/001* (2013.01); *C08J 5/12* (2013.01); *C08J 2300/22* (2013.01); *C08J 2329/14* (2013.01)

(56) References Cited

U.S. PATENT DOCUMENTS

| | | | | |
|---|---|---|---|---|
| 6,372,355 B1* | 4/2002 | Noda | ............... | B32B 27/20 428/447 |
| 6,559,212 B1* | 5/2003 | D'Errico | ........... | B32B 17/10605 428/411.1 |
| 6,984,679 B2* | 1/2006 | Papenfuhs | ........ | B32B 17/10761 524/284 |
| 7,943,845 B2* | 5/2011 | Hayes | ............... | B32B 17/10036 136/244 |
| 8,722,194 B2* | 5/2014 | Asanuma | .......... | B32B 17/10761 428/436 |
| 2003/0144396 A1 | 7/2003 | D'Errico et al. | | |
| 2003/0214715 A1 | 11/2003 | Bermel | | |
| 2005/0170160 A1 | 8/2005 | Moran et al. | | |
| 2008/0268204 A1 | 10/2008 | Bourcier et al. | | |
| 2012/0021230 A1 | 1/2012 | Fukatani et al. | | |
| 2012/0244364 A1 | 9/2012 | Iwamoto et al. | | |
| 2012/0288722 A1 | 11/2012 | Iwamoto et al. | | |
| 2013/0236711 A1 | 9/2013 | Lu | | |
| 2013/0337247 A1* | 12/2013 | Kitano | ............... | B32B 27/18 428/213 |
| 2014/0335364 A1* | 11/2014 | Fujita | ............... | B32B 17/10036 428/437 |
| 2015/0116649 A1 | 4/2015 | Watanabe | | |
| 2016/0060160 A1 | 3/2016 | Machida et al. | | |
| 2016/0152007 A1 | 6/2016 | Tsunoda et al. | | |
| 2016/0154153 A1 | 6/2016 | Tsunoda et al. | | |
| 2018/0044228 A1 | 2/2018 | Machida et al. | | |
| 2020/0031099 A1 | 1/2020 | Tsunoda et al. | | |

FOREIGN PATENT DOCUMENTS

| | | |
|---|---|---|
| CN | 103391907 A | 11/2013 |
| JP | 8-109048 A | 4/1996 |
| JP | 10-338556 A | 12/1998 |
| JP | 2002-68785 A | 3/2002 |
| JP | 2004-67427 A | 3/2004 |
| JP | 2004-107143 A | 4/2004 |
| JP | 2005-324355 A | 11/2005 |
| JP | 2011-132120 A | 7/2011 |
| JP | 2011-225449 A | 11/2011 |
| JP | 2011225432 A | 11/2011 |
| JP | 2011-257492 A | 12/2011 |
| JP | 2013-163383 A | 8/2013 |
| JP | 2013-200515 A | 10/2013 |
| JP | 2013-224025 A | 10/2013 |
| JP | 2013-224257 A | 10/2013 |
| JP | 2014-210698 A | 11/2014 |
| JP | 2015-196608 A | 11/2015 |
| TW | 201318856 A1 | 5/2013 |
| TW | 201321186 A1 | 6/2013 |
| WO | WO-2013/051454 A1 | 4/2013 |
| WO | WO-2013/051455 A1 | 4/2013 |
| WO | WO-2013051454 A1 * | 4/2013 ............... C08J 5/18 |
| WO | WO-2014/200108 A1 | 12/2014 |

OTHER PUBLICATIONS

Minagawa & White—TiO2 on rheology of polymer melts—J.Appl. Poly.Sci.—1976 (Year: 1976).*
Omnexus—Acrylic plastic—density—Oct. 19, 2019 (Year: 2019).*
International Search Report for the Application No. PCT/JP2016/060609 dated May 31, 2016.
International Search Report for the Application No. PCT/JP2016/060607 dated May 17, 2016.
International Search Report for the Application No. PCT/JP2016/060608 dated May 24, 2016.
International Search Report for the Application No. PCT/JP2016/060606 dated May 17, 2016.
Written Opinion of the International Searching Authority (PCT/ISA/237) for the Application No. PCT/JP2016/060609 dated May 31, 2016.
Written Opinion of the International Searching Authority (PCT/ISA/237) for the Application No. PCT/JP2016/060607 dated May 17, 2016.
Written Opinion of the International Searching Authority (PCT/ISA/237) for the Application No. PCT/JP2016/060608 dated May 24, 2016.
Written Opinion of the International Searching Authority (PCT/ISA/237) for the Application No. PCT/JP2016/060606 dated May 17, 2016.
Non-Final Office Action for the U.S. Appl. No. 15/563,506 from United States Patent and Trademark Office dated Mar. 18, 2019.
Ajji, A. et al., "Correlations between Orientation and Some Properties of Polymer Films and Sheets", Journal of Plastic Film and Sheeting, 2002, vol. 18, pp. 105-116.
Cao, Hui-lin et al., "Study on Processing Technology and Property of PVB Film", China Plastics Industry, 2006, vol. 34, No. 6, pp. 29-32.
Taiwanese Office Action for the Application No. 10820518850 dated May 31, 2019.
The First Office Action for the Application No. 201680018424.8 from The State Intellectual Property Office of the People's Republic of China dated Jul. 3, 2019.
Notification of Reasons for Refusal for the Application No. 2016-522075 from Japan Patent Office dated Aug. 20, 2019.
Non-Final Office Action for the U.S. Appl. No. 15/563,402 from the United States Patent and Trademark Office dated Jul. 19, 2019.
The First Office Action for the Application No. 201680018419.7 from The State Intellectual Property Office of the People's Republic of China dated Jul. 31, 2019.

(56) References Cited

OTHER PUBLICATIONS

Supplementary European Search Report for the Application No. EP 16 773 089.4 dated Oct. 23, 2018.
Supplementary European Search Report for the Application No. EP 16 773 087.8 dated Oct. 8, 2018.
Supplementary European Search Report for the Application No. EP 16 773 088.6 dated Nov. 20, 2018.
Supplementary European Search Report for the Application No. EP 16 773 090.2 dated Oct. 23, 2018.
Final Office Action for the U.S. Appl. No. 15/563,479 from the United States Patent and Trademark Office dated Nov. 27, 2018.
Final Office Action for the Application No. 15/563,506 from the United States Patent and Trademark Office dated Nov. 20, 2018.
Ajji, A. et al., "Correlations Between Orientation and Some Properties of Polymer Films and Sheets", Journal of Plastic Film & Sheeting, 2002, vol. 18, pp. 105-116.
Non-Final Office Action for the U.S. Appl. No. 15/563,479 from the United States Patent and Trademark Office dated Jul. 25, 2018.
Non-Final Office Action for the U.S. Appl. No. 15/563,506 from the United States Patent and Trademark Office dated Jul. 19, 2018.
Japanese Office Action for the Application No. 2016-530262 dated Oct. 15, 2019.
Examiner's Answer for the U.S. Appl. No. 15/563,479 from United States Patent and Trademark Office dated Nov. 13, 2019.
Final Office Action for the U.S. Appl. No. 15/563,402 from the United States Patent and Trademark Office dated Dec. 11, 2019.
Reconsideration Report for the Application No. 2016-530262 from Japan Patent Office dated Jan. 16, 2020.
Examination Report for Application No. 201737034373 from Intellectual Property India Patent Office dated Jan. 2, 2020.
Examination Report for Application No. 201737034379 from Intellectual Property India Patent Office dated Jan. 11, 2020.
Examination Report for Application No. 201737034377 from Intellectual Property India Patent Office dated Jan. 23, 2020.
Examination Report for Application No. 201737034375 from Intellectual Property India Patent Office dated Feb. 17, 2020.

\* cited by examiner

[FIG. 1]
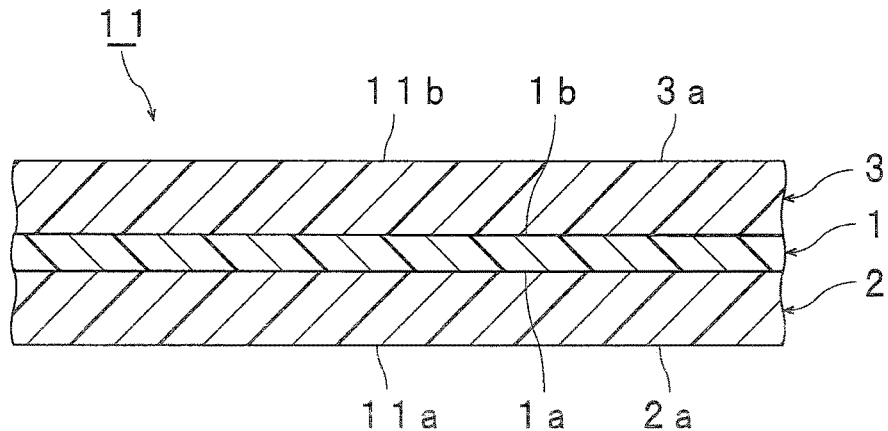
[FIG. 2]
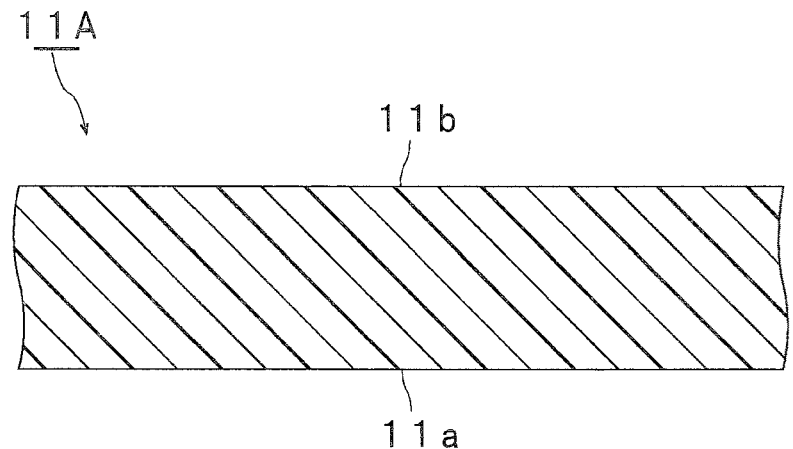
[FIG. 3]
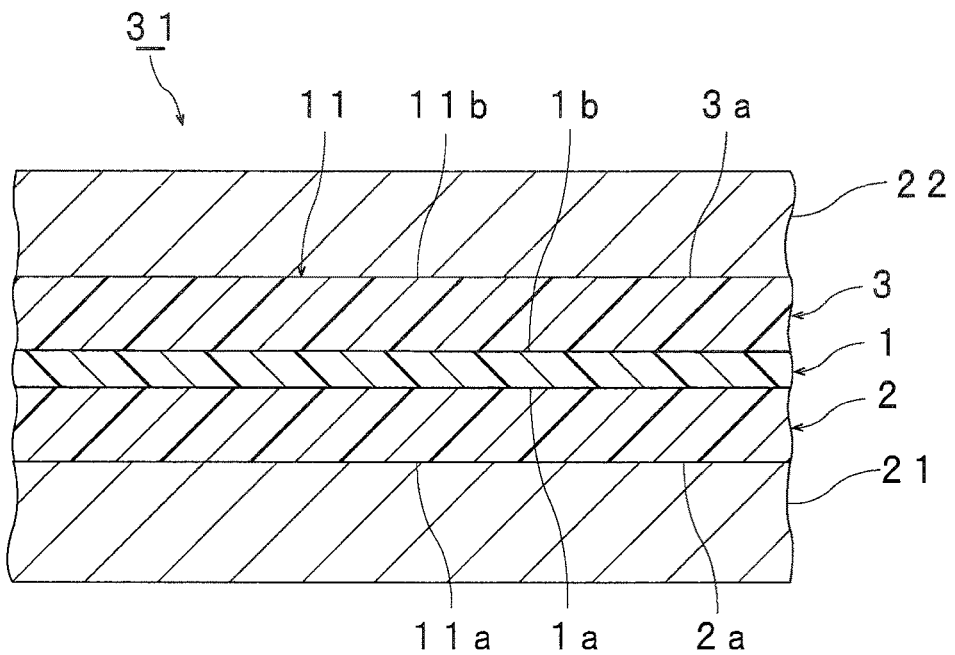

[FIG. 4]
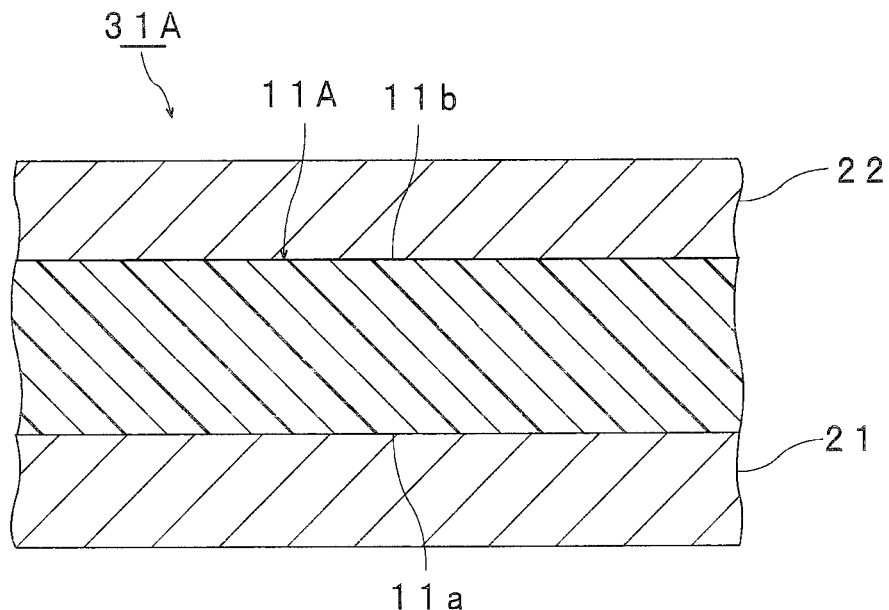
[FIG. 5]
(a)
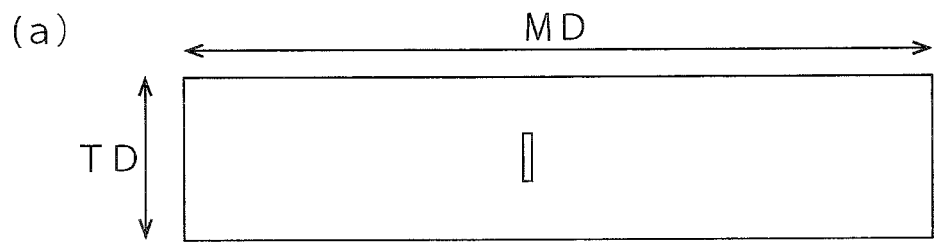
(b)
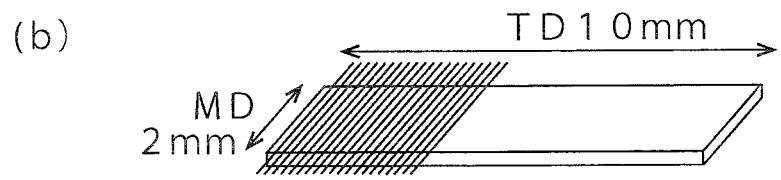
(c)
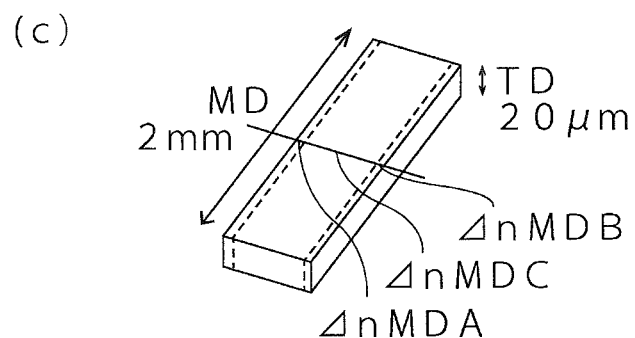

[FIG. 6]
(a)
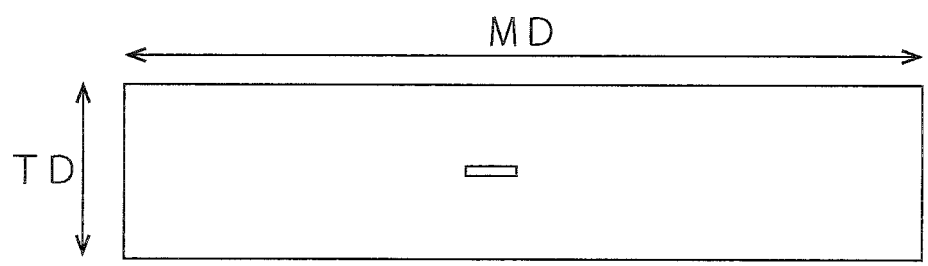
(b)
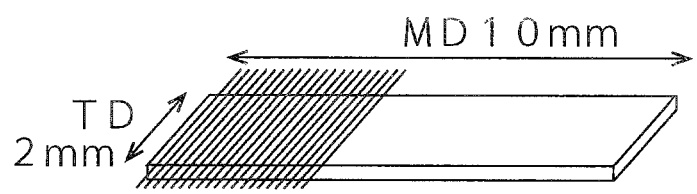
(c)
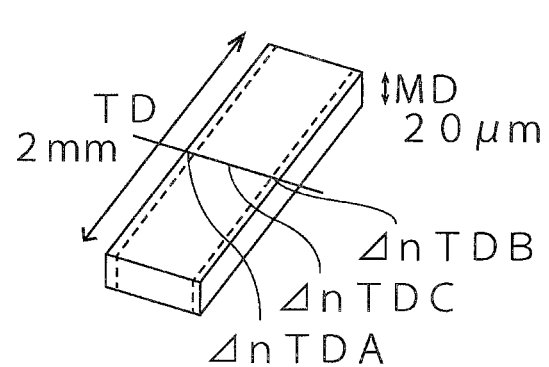

INTERLAYER FOR LAMINATED GLASS AND LAMINATED GLASS

TECHNICAL FIELD

The present invention relates to an interlayer film for laminated glass which is used for obtaining laminated glass. Moreover, the present invention relates to laminated glass prepared with the interlayer film for laminated glass.

BACKGROUND ART

Since laminated glass generates only a small amount of scattering glass fragments even when subjected to external impact and broken, laminated glass is excellent in safety. As such, the laminated glass is widely used for automobiles, railway vehicles, aircraft, ships, buildings, and the like. The laminated glass has a structure in which an interlayer film for laminated glass is sandwiched between two glass plates.

As an example of the interlayer film for laminated glass, the following Patent Document 1 discloses a polyvinyl acetal film formed of a polyvinyl acetal with a content of the vinyl alcohol unit of 8 to 30% by mass. The polyvinyl acetal film has a three-layer structure in which a center part C exists between two outer parts of a first surface part A and a second surface part B. The polyvinyl acetal film satisfies the following expressions (I) to (III).

$$\Delta n_{MDA} \geq \Delta n_{MDB} \quad (I)$$

$$\Delta n_{MDB} - \Delta n_{MDC} \geq 0.1 \times 10^{-3} \quad (II)$$

$$\Delta n_{MDC} \leq 0.2 \times 10^{-3} \quad (III)$$

In the expressions, $\Delta n_{MDA}$ represents a birefringence index in the machine flow direction of the first surface part A, $\Delta n_{MDB}$ represents a birefringence index in the machine flow direction of the second surface part B, and $\Delta n_{MDC}$ represents a birefringence index in the machine flow direction of the center part C.

RELATED ART DOCUMENT

Patent Document

Patent Document 1: WO 2013/051454 A1

SUMMARY OF THE INVENTION

Problems to be Solved by the Invention

The laminated glass has been produced by sandwiching an interlayer film between two lamination glass members such as glass plates.

However, from an end part of laminated glass prepared with a conventional interlayer film, an interlayer film portion sometimes protrudes.

Specifically, there are many cases in which an interlayer film for laminated glass is preliminarily press-bonded between two glass plates having the same shape to obtain a laminate, then, the laminate is put into a vacuum bag, and the inside of the vacuum bag is vacuumized so that the air remaining between the glass plate and the interlayer film is removed to produce laminated glass. When the laminate is put into a vacuum bag and the inside of the vacuum bag is vacuumized so that the air remaining between the glass plate and the interlayer film is removed, an interlayer film portion is liable to protrude from the end part. In particular, among an MD direction and a TD direction, in the TD direction, there is a tendency for an interlayer film portion to protrude from the end part.

An object of the present invention is to provide an interlayer film for laminated glass with which protrusion of an interlayer film portion in the TD direction can be suppressed at the time of producing laminated glass. Moreover, the present invention is also aimed at providing laminated glass prepared with the interlayer film for laminated glass.

Means for Solving the Problems

According to a broad aspect of the present invention, there is provided an interlayer film for laminated glass arranged between a first lamination glass member and a second lamination glass member to obtain laminated glass, the interlayer film containing a thermoplastic resin and a plasticizer, the interlayer film having an MD direction and a TD direction, and when, in the MD direction of the interlayer film, a birefringence index of the first surface part, a birefringence index of the second surface part, and a birefringence index of the center part are defined as ΔnMDA, ΔnMDB, and ΔnMDC, respectively, ΔnMDA, ΔnMDB, and ΔnMDC each being $0.25 \times 10^{-3}$ or less.

In a specific aspect of the interlayer film for laminated glass according to the present invention, ΔnMDA, ΔnMDB, and ΔnMDC each are more than $0.03 \times 10^{-3}$.

In a specific aspect of the interlayer film for laminated glass according to the present invention, when a birefringence index of the first surface part, a birefringence index of the second surface part, and a birefringence index of the center part are defined as ΔnTDA, ΔnTDB, and ΔnTDC, respectively, ΔnTDA, ΔnTDB, and ΔnTDC each are more than $0.03 \times 10^{-3}$.

In a specific aspect of the interlayer film for laminated glass according to the present invention, the glass transition temperature of the interlayer film is 35° C. or less or the content of the plasticizer in the interlayer film is 35 parts by weight or more relative to 100 parts by weight of the thermoplastic resin in the interlayer film.

It is preferred that the glass transition temperature of the interlayer film be 35° C. or less. It is preferred that the content of the plasticizer in the interlayer film be 35 parts by weight or more relative to 100 parts by weight of the thermoplastic resin in the interlayer film. It is more preferred that the glass transition temperature of the interlayer film be 35° C. or less and the content of the plasticizer in the interlayer film be 35 parts by weight or more relative to 100 parts by weight of the thermoplastic resin in the interlayer film.

In a specific aspect of the interlayer film for laminated glass according to the present invention, the interlayer film is arranged between a first lamination glass member and a second lamination glass member and then made to pass through a gap between two heated rolls to obtain laminated glass.

In a specific aspect of the interlayer film for laminated glass according to the present invention, the interlayer film is arranged between a first glass plate and a second glass plate to obtain laminated glass.

In a specific aspect of the interlayer film for laminated glass according to the present invention, the interlayer film is a melt-extrusion molded product.

According to a broad aspect of the present invention, there is provided laminated glass including a first lamination glass member, a second lamination glass member, and the above-described interlayer film for laminated glass, the interlayer film for laminated glass being arranged between the first lamination glass member and the second lamination glass member.

Effect of the Invention

With regard to the interlayer film for laminated glass according to the present invention, since the interlayer film contains a thermoplastic resin and a plasticizer, the interlayer film has an MD direction and a TD direction, the interlayer film has a first surface part at one side in a thickness direction, a second surface part at the other side in the thickness direction, and a center part between the first surface part and the second surface part, and ΔnMDA, ΔnMDB, and ΔnMDC each are $0.25 \times 10^{-3}$ or less, protrusion of an interlayer film portion can be suppressed at the time of producing laminated glass prepared with the interlayer film. At an end part in the TD direction from which an interlayer film portion is particularly liable to protrude, an interlayer film portion can be made less liable to protrude from the end part.

BRIEF DESCRIPTION OF DRAWINGS

FIG. 1 is a sectional view schematically showing an interlayer film for laminated glass in accordance with a first embodiment of the present invention.

FIG. 2 is a sectional view schematically showing an interlayer film for laminated glass in accordance with a second embodiment of the present invention.

FIG. 3 is a sectional view schematically showing an example of laminated glass prepared with the interlayer film for laminated glass shown in FIG. 1.

FIG. 4 is a sectional view schematically showing an example of laminated glass prepared with the interlayer film for laminated glass shown in FIG. 2.

FIGS. 5(a) to 5(c) are figures for illustrating a measurement sample to be measured for a birefringence index in the MD direction.

FIGS. 6(a) to 6(c) are figures for illustrating a measurement sample to be measured for a birefringence index in the TD direction.

MODE(S) FOR CARRYING OUT THE INVENTION

Hereinafter, the present invention will be described in detail.

The interlayer film for laminated glass (in the present specification, sometimes abbreviated as "the interlayer film") according to the present invention is arranged between a first lamination glass member and a second lamination glass member to obtain laminated glass. The interlayer film according to the present invention contains a thermoplastic resin and a plasticizer. The interlayer film according to the present invention has an MD direction and a TD direction. The interlayer film according to the present invention has a first surface part at one side in a thickness direction, a second surface part at the other side in the thickness direction, and a center part between the first surface part and the second surface part.

In the MD direction of the interlayer film, a birefringence index of the first surface part is defined as ΔnMDA, a birefringence index of the second surface part is defined as ΔnMDB, and a birefringence index of the center part is defined as ΔnMDC. In the interlayer film according to the present invention, ΔnMDA, ΔnMDB, and ΔnMDC each are $0.25 \times 10^{-3}$ or less.

ΔnMDA: the birefringence index of the first surface part in the MD direction of the interlayer film ΔnMDB: the birefringence index of the second surface part in the MD direction of the interlayer film ΔnMDC: the birefringence index of the center part in the MD direction of the interlayer film Since the interlayer film according to the present invention is provided with the above-mentioned configuration, protrusion of an interlayer film portion can be suppressed at the time of producing laminated glass. The laminated glass is produced by sandwiching an interlayer film between two lamination glass members such as glass plates. In particular, by using the interlayer film according to the present invention, at the time of producing laminated glass, an interlayer film portion is made less liable to protrude from the end part. Specifically, there are many cases in which an interlayer film for laminated glass is preliminarily press-bonded between two glass plates having the same shape to obtain a laminate, then, the laminate is put into a vacuum bag, and the inside of the vacuum bag is vacuumized so that the air remaining between the glass plate and the interlayer film is removed to produce laminated glass. By using the interlayer film according to the present invention, even when the laminate is put into a vacuum bag and the inside of the vacuum bag is vacuumized, an interlayer film portion is made less liable to protrude from the end part. Moreover, at an end part in the TD direction from which an interlayer film portion is particularly liable to protrude, an interlayer film portion is made less liable to protrude from the end part.

In the TD direction of the interlayer film, a birefringence index of the first surface part is defined as ΔnTDA, a birefringence index of the second surface part is defined as ΔnTDB, and a birefringence index of the center part is defined as ΔnTDC.

ΔnTDA: the birefringence index of the first surface part in the TD direction of the interlayer film ΔnTDB: the birefringence index of the second surface part in the TD direction of the interlayer film ΔnTDC: the birefringence index of the center part in the TD direction of the interlayer film A higher absolute value among the absolute value of the difference between ΔnMDA and ΔnMDC and the absolute value of the difference between ΔnMDB and ΔnMDC is defined as ΔnMDMAX. A higher absolute value among the absolute value of the difference between ΔnTDA and ΔnTDC and the absolute value of the difference between ΔnTDB and ΔnTDC is defined as ΔnTDMAX.

ΔnMDMAX: the higher absolute value among the absolute value of the difference between ΔnMDA and ΔnMDC and the absolute value of the difference between ΔnMDB and ΔnMDC ΔnTDMAX: the higher absolute value among the absolute value of the difference between ΔnTDA and ΔnTDC and the absolute value of the difference between ΔnTDB and ΔnTDC From the viewpoint of enabling an interlayer film for laminated glass to be efficiently produced, ΔnMDA, ΔnMDB, and ΔnMDC each are preferably more than $0.03 \times 10^{-3}$ and more preferably $0.04 \times 10^{-3}$ or more.

From the viewpoint of enabling an interlayer film for laminated glass to be prevented from varying in its length in the MD direction between before and after the preliminary press-bonding of the interlayer film between glass plates, ΔnTDA, ΔnTDB, and ΔnTDC each are preferably more than $0.03 \times 10^{-3}$ and more preferably $0.04 \times 10^{-3}$ or more.

Examples of a method of controlling the birefringence index include a method of controlling tensile force applied to an interlayer film for laminated glass at the time of producing the interlayer film for laminated glass, a method of controlling strain which has been applied to an interlayer film for laminated glass at the time of producing the interlayer film for laminated glass, and the like. Although the method of controlling tensile force applied to an interlayer film for laminated glass is not particularly limited, examples thereof include a method of providing a process in which an interlayer film for laminated glass is applied with substantially no tensile force at the time of extrusion-molding the interlayer film for laminated glass, a method of providing a process in which an interlayer film for laminated glass is applied with substantially no tensile force and cooled, and the like. Although the method of controlling strain which has been applied to an interlayer film for laminated glass at the time of producing the interlayer film for laminated glass is not particularly limited, examples thereof include a method of immersing an interlayer film for laminated glass in a water tank containing water at 20 to 60° C. at the time of producing the interlayer film for laminated glass, a method of decreasing the temperature of an interlayer film for laminated glass to 40° C. or less by making the interlayer film pass through a cooling roll, a method of subjecting an interlayer film for laminated glass to a heating treatment at 100 to 150° C., a method of subjecting an interlayer film for laminated glass to a heating treatment at 30 to 60° C., and the like. In the method of immersing an interlayer film for laminated glass in a water tank containing water at 20 to 60° C. at the time of producing the interlayer film for laminated glass, the time taken for immersing an interlayer film for laminated glass in a water tank containing water at 20 to 60° C. is preferably 3 minutes or less, more preferably 2 minutes or less, further preferably 1 minute or less, and especially preferably 0.5 minutes or less. In the method of subjecting an interlayer film for laminated glass to a heating treatment at 100 to 150° C., the time taken for the heating treatment is preferably 2 minutes or less, more preferably 1 minute or less, and further preferably 0.5 minutes or less. In the method of subjecting an interlayer film for laminated glass to a heating treatment at 30 to 60° C., the time taken for the heating treatment is preferably 90 minutes or less, more preferably 60 minutes or less, preferably 20 minutes or more, and more preferably 30 minutes or more.

From the viewpoint of effectively preventing the positional displacement between two lamination glass members, the glass transition temperature of the interlayer film is preferably 35° C. or less, more preferably 33° C. or less, and further preferably 31° C. or less. The glass transition temperature of each of the first surface part, the second surface part, and the center part is preferably 35° C. or less, more preferably 33° C. or less, and further preferably 31° C. or less. The upper limit of the glass transition temperature is not particularly limited. From the viewpoint of improving the handling properties, the glass transition temperature of each of the first surface part, the second surface part, and the center part is preferably 31° C. or less.

From the viewpoint of effectively preventing the positional displacement between two lamination glass members, the content of the plasticizer in the interlayer film is preferably 35 parts by weight or more and more preferably 37 parts by weight or more relative to 100 parts by weight of the thermoplastic resin in the interlayer film. The content of the plasticizer is an average content in the whole interlayer film.

The upper limit of the content of the plasticizer is not particularly limited. From the viewpoint of suppressing the bleed-out of a plasticizer, the content of the plasticizer in the interlayer film is preferably 80 parts by weight or less and more preferably 45 parts by weight or less relative to 100 parts by weight of the thermoplastic resin in the interlayer film.

From the viewpoint of effectively preventing the positional displacement between two lamination glass members, it is preferred that the glass transition temperature of the interlayer film be 33° C. or less and the content of the plasticizer in the interlayer film be 35 parts by weight or more relative to 100 parts by weight of the thermoplastic resin in the interlayer film.

Examples of a method of measuring the glass transition temperature include a method of measuring an interlayer film for the viscoelasticity with the use of a viscoelasticity measuring apparatus "DVA-200" available from IT KEISOKU SEIGYO K.K. immediately after being stored for 12 hours under an environment of a room temperature of 23±2° C. and a humidity of 25±5%. It is preferred that the interlayer film be cut into a size of 8 mm in longitudinal width by 5 mm in lateral width and be measured, using the shear mode, for the glass transition temperature under the condition in which the temperature is increased from −30° C. to 100° C. at a temperature increasing rate of 5° C./minute and under the condition of a frequency of 1 Hz and a strain of 0.08%.

The first surface part is a layer portion with a thickness of 50 μm from a surface at one side (the first surface side) toward the inside in the thickness direction and a position at the depth of 20 μm is measured for the birefringence index. The second surface part is a layer portion with a thickness of 50 μm from a surface at the other side (the second surface side opposite to the first surface) toward the inside in the thickness direction and a position at the depth of 20 μm is measured for the birefringence index. The center part is a portion between the first surface part and the second surface part and a portion excluding both the first surface part and the second surface part.

The interlayer film has an MD direction and a TD direction. For example, the interlayer film is obtained by melt-extrusion molding and is a melt-extrusion molded product. The MD direction is a flow direction of an interlayer film at the time of producing the interlayer film. The TD direction is a direction orthogonal to the flow direction of an interlayer film at the time of producing the interlayer film and a direction orthogonal to the thickness direction of the interlayer film.

(Measurement Method of Birefringence Index in MD Direction)

The birefringence indexes ΔnMDA, ΔnMDB, and ΔnMDC can be measured in the following manner.

(i) From an area near the center in the TD direction (preferably an area near the center in the MD direction and in the TD direction) of an interlayer film, a small rectangular piece of MD×TD=2 mm×10 mm is cut out (for example, FIG. 5(a)). The small piece is installed in a cryo-microtome apparatus.

(ii) Next, the small piece collected as above is sliced in parallel at 20-μm intervals along the length direction (TD direction) of the small piece at −20° C. (for example, FIG. 5(b)) to prepare 20 sliced pieces (MD×TD=2 mm×20 μm) for observation (for example, FIG. 5(c)). From among these sliced pieces, 3 sliced pieces each of which has a smooth sliced face and is free from thickness unevenness by slicing are selected. The sliced pieces are measured for the thickness with the use of a laser microscope.

(iii) Next, a sliced piece is arranged so that a place measured for the thickness is aligned at a diagonal position to the extinction position+45°. To the lens barrel of a polarization microscope, a Berek compensator is attached through an adapter for plate inspection. Under white light illumination, the interference light from a sliced face is observed to confirm the retardation value of 1 wavelength or less.

(iv) In the filter holder of the microscope, an interference filter IF546 (monochromatic light with a wavelength of 546 nm) is placed. The Berek compensator is taken off. The sliced piece is arranged again so that a place to be observed is aligned at a diagonal position to the extinction position+45°. To the lens barrel of the polarization microscope, a Bräce-Köhler compensator is attached through an adapter for plate inspection. An angle knob of the Bräce-Köhler compensator is rotated to read a rotation angle θ at a position where the place to be observed is illuminated most darkly. This operation is repeated four times for the respective areas of a first surface part A, a second surface part B, and a center part C of the sliced piece. An average value of four measured values is calculated.

(v) The angle θ obtained as above is substituted into the equation of [R=R0×sin(2×|θ−θ0|)] to determine a retardation value R, the retardation value is divided by a measured value of the thickness to determine a birefringence index, such measurement is performed three times (n=3) in the same manner as above, and an average value of three measured values thereof is defined as the birefringence index Δn. In this connection, R0 represents a constant peculiar to a compensator and θ0 represents an angle at which the observation field is illuminated most darkly when no sample is placed. On this occasion, a 20-μm depth position of the first surface part A is measured for the birefringence index ΔnMDA in the MD direction (length direction), a 20-μm depth position of the second surface part B is measured for the birefringence index ΔnMDB in the MD direction (length direction), and a center position in the thickness direction (a center position of the sliced face) of the center part C is measured for the birefringence index ΔnMDC in the MD direction (length direction).

(Measurement Method of Birefringence Index in TD Direction)

The birefringence indexes ΔnTDA, ΔnTDB, and ΔnTDC can be measured in the following manner.

(i) From an area near the center in the TD direction (preferably an area near the center in the MD direction and in the TD direction) of an interlayer film, a small rectangular piece of TD×MD=2 mm×10 mm is cut out (for example, FIG. 6(a)). The small piece is installed in a cryo-microtome apparatus.

(ii) Next, the small piece collected as above is sliced in parallel at 20-μm intervals along the length direction (MD direction) of the small piece at −20° C. (for example, FIG. 6(b)) to prepare 20 sliced pieces (TD×MD=2 mm×20 μm) for observation (for example, FIG. 6(c)). From among these sliced pieces, 3 sliced pieces each of which has a smooth sliced face and is free from thickness unevenness by slicing are selected. The sliced pieces are measured for the thickness with the use of a laser microscope.

(iii) Next, a sliced piece is arranged so that a place measured for the thickness is aligned at a diagonal position to the extinction position+45°. To the lens barrel of a polarization microscope, a Berek compensator is attached through an adapter for plate inspection. Under white light illumination, the interference light from a sliced face is observed to confirm the retardation value of 1 wavelength or less.

(iv) In the filter holder of the microscope, an interference filter IF546 (monochromatic light with a wavelength of 546 nm) is placed. The Berek compensator is taken off. The sliced piece is arranged again so that a place to be observed is aligned at a diagonal position to the extinction position+45°. To the lens barrel of the polarization microscope, a Bräce-Köhler compensator is attached through an adapter for plate inspection. An angle knob of the Bräce-Köhler compensator is rotated to read a rotation angle θ at a position where the place to be observed is illuminated most darkly. This operation is repeated four times for the respective areas of a first surface part A, a second surface part B, and a center part C of the sliced piece. An average value of four measured values is calculated.

(v) The angle θ obtained as above is substituted into the equation of [R=R0× sin (2×|θ−θ0|)] to determine a retardation value R, the retardation value is divided by a measured value of the thickness to determine a birefringence index, such measurement is performed three times (n=3) in the same manner as above, and an average value of three measured values thereof is defined as the birefringence index Δn. In this connection, R0 represents a constant peculiar to a compensator and θ0 represents an angle at which the observation field is illuminated most darkly when no sample is placed. On this occasion, a 20-μm depth position of the first surface part A is measured for the birefringence index ΔnTDA in the TD direction (length direction), a 20-μm depth position of the second surface part B is measured for the birefringence index ΔnTDB in the TD direction (length direction), and a center position in the thickness direction (a center position of the sliced face) of the center part C is measured for the birefringence index ΔnTDC in the TD direction (length direction).

The interlayer film may only have a one-layer structure and may have a two or more-layer structure. The interlayer film may have a two-layer structure and may have a three or more-layer structure. For example, when the interlayer film is a single-layered interlayer film composed only of a first layer, the first layer has a first surface part, a center part, and a second surface part. For example, when the interlayer film is a multi-layered interlayer film in which a first layer, a second layer, and a third layer are arranged side by side in this order, the first layer may have a first surface part, the second layer may have a center part, and the third layer may have a second surface part.

In this connection, the first surface part is a layer portion with the above-mentioned thickness from a surface at one side (the first surface side) toward the inside in the thickness direction. The second surface part is a layer portion with the above-mentioned thickness from a surface at the other side (the second surface side opposite to the first surface) toward the inside in the thickness direction. Accordingly, when the interlayer film is a multi-layered interlayer film in which a first layer, a second layer, and a third layer are arranged side by side in this order, the whole first layer does not always correspond to the first surface part, the second layer itself does not always correspond to the center part, and the third layer itself does not always correspond to the second surface part.

Hereinafter, specific embodiments of the present invention will be described with reference to the drawings.

FIG. 1 shows an interlayer film for laminated glass in accordance with a first embodiment of the present invention schematically represented as a sectional view.

An interlayer film 11 shown in FIG. 1 is a multi-layered interlayer film having a two or more-layer structure. The interlayer film 11 is used for obtaining laminated glass. The interlayer film 11 is an interlayer film for laminated glass. The interlayer film 11 is provided with a first layer 1, a second layer 2, and a third layer 3. The second layer 2 is arranged on a first surface 1a of the first layer 1 to be layered thereon. The third layer 3 is arranged on a second surface 1b opposite to the first surface 1a of the first layer 1 to be layered thereon. The first layer 1 is an intermediate layer. Each of the second layer 2 and the third layer 3 is a protective layer and is a surface layer in the present embodiment. The first layer 1 is arranged between the second layer 2 and the third layer 3 to be sandwiched therebetween. Accordingly, the interlayer film 11 has a multilayer structure (a second layer 2/a first layer 1/a third layer 3) in which the second layer 2, the first layer 1, and the third layer 3 are layered in this order.

In this connection, other layers may be arranged between the second layer 2 and the first layer 1 and between the first layer 1 and the third layer 3, respectively. It is preferred that each of the second layer 2 and the third layer 3 be directly layered on the first layer 1.

FIG. 2 shows an interlayer film for laminated glass in accordance with a second embodiment of the present invention schematically represented as a sectional view.

The interlayer film 11A shown in FIG. 2 is a single-layered interlayer film having a one-layer structure. The interlayer film 11A is singly constituted by a first layer. The interlayer film 11A is used for obtaining laminated glass. The interlayer film 11A is an interlayer film for laminated glass.

Hereinafter, the details of the first layer, the second layer and the third layer which constitute the interlayer film according to the present invention, and the details of each ingredient contained in the first layer, the second layer and the third layer will be described.

(Polyvinyl Acetal Resin or Thermoplastic Resin)

The first layer preferably contains a thermoplastic resin (hereinafter, sometimes described as a thermoplastic resin (1)) and preferably contains a polyvinyl acetal resin (hereinafter, sometimes described as a polyvinyl acetal resin (1)) as the thermoplastic resin (1). The second layer preferably contains a thermoplastic resin (hereinafter, sometimes described as a thermoplastic resin (2)) and preferably contains a polyvinyl acetal resin (hereinafter, sometimes described as a polyvinyl acetal resin (2)) as the thermoplastic resin (2). The third layer preferably contains a thermoplastic resin (hereinafter, sometimes described as a thermoplastic resin (3)) and preferably contains a polyvinyl acetal resin (hereinafter, sometimes described as a polyvinyl acetal resin (3)) as the thermoplastic resin (3). Although the polyvinyl acetal resin (1), the polyvinyl acetal resin (2), and the polyvinyl acetal resin (3) may be the same as or different from one another, it is preferred that the polyvinyl acetal resin (1) be different from the polyvinyl acetal resin (2) and the polyvinyl acetal resin (3) because the sound insulating properties are further heightened. The thermoplastic resin (2) and the thermoplastic resin (3) may be the same as or different from each other. One kind of each of the polyvinyl acetal resin (1), the polyvinyl acetal resin (2), and the polyvinyl acetal resin (3) may be used alone, and two or more kinds thereof may be used in combination. One kind of each of the thermoplastic resin (2) and the thermoplastic resin (3) may be used alone, and two or more kinds thereof may be used in combination.

Examples of the thermoplastic resin include a polyvinyl acetal resin, an ethylene-vinyl acetate copolymer resin, an ethylene-acrylic acid copolymer resin, a polyurethane resin, a polyvinyl alcohol resin, and the like. Thermoplastic resins other than these may be used.

For example, the polyvinyl acetal resin can be produced by acetalizing polyvinyl alcohol with an aldehyde. It is preferred that the polyvinyl acetal resin be an acetalized product of polyvinyl alcohol. For example, the polyvinyl alcohol can be obtained by saponifying polyvinyl acetate. The saponification degree of the polyvinyl alcohol generally falls within the range of 70 to 99.9% by mole.

The average polymerization degree of the polyvinyl alcohol (PVA) is preferably 200 or more, more preferably 500 or more, even more preferably 1500 or more, further preferably 1600 or more, especially preferably 2600 or more, most preferably 2700 or more, preferably 5000 or less, more preferably 4000 or less and further preferably 3500 or less. When the average polymerization degree is the above lower limit or more, the penetration resistance of laminated glass is further enhanced. When the average polymerization degree is the above upper limit or less, formation of an interlayer film is facilitated.

The average polymerization degree of the polyvinyl alcohol is determined by a method in accordance with JIS K6726 "Testing methods for polyvinyl alcohol".

It is preferred that the number of carbon atoms of the acetal group in the polyvinyl acetal resin lie within the range of 3 to 5, and it is preferred that the number of carbon atoms of the acetal group be 4 or 5.

In general, as the aldehyde, an aldehyde with 1 to 10 carbon atoms is suitably used. Examples of the aldehyde with 1 to 10 carbon atoms include formaldehyde, acetaldehyde, propionaldehyde, n-butyraldehyde, isobutyraldehyde, n-valeraldehyde, 2-ethylbutyraldehyde, n-hexylaldehyde, n-octylaldehyde, n-nonylaldehyde, n-decylaldehyde, benzaldehyde, and the like. Of these, acetaldehyde, propionaldehyde, n-butyraldehyde, isobutyraldehyde, n-hexylaldehyde or n-valeraldehyde is preferred, acetaldehyde, propionaldehyde, n-butyraldehyde, isobutyraldehyde or n-valeraldehyde is more preferred, and n-butyraldehyde or n-valeraldehyde is further preferred. One kind of the aldehyde may be used alone, and two or more kinds thereof may be used in combination.

The content of the hydroxyl group (the amount of hydroxyl groups) of the polyvinyl acetal resin (1) is preferably 17% by mole or more, more preferably 20% by mole or more, further preferably 22% by mole or more, preferably 30% by mole or less, more preferably less than 27% by mole, and further preferably 25% by mole or less. When the content of the hydroxyl group is the above lower limit or more, the adhesive force of the interlayer film is further heightened. In particular, when the content of the hydroxyl group of the polyvinyl acetal resin (1) is 20% by mole or more, the resin is high in reaction efficiency and is excellent in productivity, and moreover, when less than 27% by mole, the sound insulating properties of laminated glass are further heightened. Moreover, when the content of the hydroxyl group is the above upper limit or less, the flexibility of the interlayer film is enhanced and the handling of the interlayer film is facilitated.

In the case where the interlayer film is single-layered or the case where the first layer is an outermost layer of the interlayer film, the content of the hydroxyl group (the amount of hydroxyl groups) of the polyvinyl acetal resin (1) is preferably 25% by mole or more, more preferably 27% by mole or more, further preferably 29% by mole or more, preferably 38% by mole or less, more preferably 36% by mole or less, further preferably 34% by mole or less, and especially preferably 32% by mole or less. When the content of the hydroxyl group is the above lower limit or more, the mechanical strength of the interlayer film is further heightened. In particular, when the content of the hydroxyl group of the polyvinyl acetal resin (1) is 27% by mole or more, the resin is high in reaction efficiency and is excellent in productivity. Moreover, when the content of the hydroxyl group is the above upper limit or less, the flexibility of the interlayer film is enhanced and the handling of the interlayer film is facilitated.

The content of the hydroxyl group of each of the polyvinyl acetal resin (2) and the polyvinyl acetal resin (3) is preferably 25% by mole or more, more preferably 28% by mole or more, more preferably 30% by mole or more, even more preferably 31.5% by mole or more, further preferably 32% by mole or more, especially preferably 33% by mole or more, preferably 37% by mole or less, more preferably 36.5% by mole or less, and further preferably 36% by mole or less. When the content of the hydroxyl group is the above lower limit or more, the adhesive force of the interlayer film is further heightened. Moreover, when the content of the hydroxyl group is the above upper limit or less, the flexibility of the interlayer film is enhanced and the handling of the interlayer film is facilitated.

From the viewpoint of further heightening the sound insulating properties, it is preferred that the content of the hydroxyl group of the polyvinyl acetal resin (1) be lower than the content of the hydroxyl group of the polyvinyl acetal resin (2). From the viewpoint of still further heightening the sound insulating properties, the absolute value of the difference between the content of the hydroxyl group of the polyvinyl acetal resin (1) and the content of the hydroxyl group of the polyvinyl acetal resin (2) is preferably 1% by mole or more, more preferably 5% by mole or more, further preferably 9% by mole or more, especially preferably 10% by mole or more, and most preferably 12% by mole or more. The absolute value of the difference between the content of the hydroxyl group of the polyvinyl acetal resin (1) and the content of the hydroxyl group of the polyvinyl acetal resin (2) is preferably 20% by mole or less.

The content of the hydroxyl group of the polyvinyl acetal resin is a mole fraction, represented in percentage, obtained by dividing the amount of ethylene groups to which the hydroxyl group is bonded by the total amount of ethylene groups in the main chain. For example, the amount of ethylene groups to which the hydroxyl group is bonded can be measured in accordance with JIS K6728 "Testing methods for polyvinyl butyral".

The acetylation degree (the amount of acetyl groups) of the polyvinyl acetal resin (1) is preferably 0.01% by mole or more, more preferably 0.1% by mole or more, even more preferably 7% by mole or more, further preferably 9% by mole or more, preferably 30% by mole or less, more preferably 25% by mole or less, and further preferably 24% by mole or less. When the acetylation degree is the above lower limit or more, the compatibility between the polyvinyl acetal resin and a plasticizer is heightened. When the acetylation degree is the above upper limit or less, with regard to the interlayer film and laminated glass, the moisture resistance thereof is enhanced. In particular, when the acetylation degree of the polyvinyl acetal resin (1) is 0.1% by mole or more and 25% by mole or less, the resulting laminated glass is excellent in penetration resistance.

In the case where the interlayer film is single-layered or the case where the first layer is an outermost layer of the interlayer film, the acetylation degree (the amount of acetyl groups) of the polyvinyl acetal resin (1) is preferably 0.01% by mole or more, more preferably 0.1% by mole or more, even more preferably 0.5% by mole or more, further preferably 0.8% by mole or more, preferably 10% by mole or less, more preferably 5% by mole or less, and further preferably 3% by mole or less. When the acetylation degree is the above lower limit or more, the compatibility between the polyvinyl acetal resin and a plasticizer is heightened. When the acetylation degree is the above upper limit or less, with regard to the interlayer film and laminated glass, the moisture resistance thereof is enhanced.

The acetylation degree of each of the polyvinyl acetal resin (2) and the polyvinyl acetal resin (3) is preferably 0.01% by mole or more, more preferably 0.5% by mole or more, preferably 10% by mole or less, and more preferably 2% by mole or less. When the acetylation degree is the above lower limit or more, the compatibility between the polyvinyl acetal resin and a plasticizer is heightened. When the acetylation degree is the above upper limit or less, with regard to the interlayer film and laminated glass, the moisture resistance thereof is enhanced.

The acetylation degree is a mole fraction, represented in percentage, obtained by dividing the amount of ethylene groups to which the acetyl group is bonded by the total amount of ethylene groups in the main chain. For example, the amount of ethylene groups to which the acetyl group is bonded can be measured in accordance with JIS K6728 "Testing methods for polyvinyl butyral".

The acetalization degree of the polyvinyl acetal resin (1) (the butyralization degree in the case of a polyvinyl butyral resin) is preferably 47% by mole or more, more preferably 60% by mole or more, preferably 85% by mole or less, more preferably 80% by mole or less and further preferably 75% by mole or less. When the acetalization degree is the above lower limit or more, the compatibility between the polyvinyl acetal resin and a plasticizer is heightened. When the acetalization degree is the above upper limit or less, the reaction time required for producing the polyvinyl acetal resin is shortened.

In the case where the interlayer film is single-layered or the case where the first layer is an outermost layer of the interlayer film, the acetalization degree of the polyvinyl acetal resin (1) (the butyralization degree in the case of a polyvinyl butyral resin) is preferably 60% by mole or more, more preferably 65% by mole or more, preferably 72% by mole or less, more preferably 70% by mole or less, and further preferably 69% by mole or less. When the acetalization degree is the above lower limit or more, the compatibility between the polyvinyl acetal resin and a plasticizer is heightened. When the acetalization degree is the above upper limit or less, the reaction time required for producing the polyvinyl acetal resin is shortened.

The acetalization degree of each of the polyvinyl acetal resin (2) and the polyvinyl acetal resin (3) (the butyralization degree in the case of a polyvinyl butyral resin) is preferably 55% by mole or more, more preferably 60% by mole or more, preferably 75% by mole or less and more preferably 71% by mole or less. When the acetalization degree is the above lower limit or more, the compatibility between the polyvinyl acetal resin and a plasticizer is heightened. When the acetalization degree is the above upper limit or less, the reaction time required for producing the polyvinyl acetal resin is shortened.

The acetalization degree is a mole fraction, represented in percentage, obtained by dividing a value obtained by subtracting the amount of ethylene groups to which the hydroxyl group is bonded and the amount of ethylene groups to which the acetyl group is bonded from the total amount of ethylene groups in the main chain by the total amount of ethylene groups in the main chain.

In this connection, it is preferred that the content of the hydroxyl group (the amount of hydroxyl groups), the acetalization degree (the butyralization degree) and the acetylation degree be calculated from the results measured by a method in accordance with JIS K6728 "Testing methods for polyvinyl butyral". In this context, a method in accordance with ASTM D1396-92 may be used. When the polyvinyl acetal resin is a polyvinyl butyral resin, the content of the hydroxyl group (the amount of hydroxyl groups), the acetalization degree (the butyralization degree) and the acetylation degree can be calculated from the results measured by a method in accordance with JIS K6728 "Testing methods for polyvinyl butyral".

From the viewpoint of further improving the penetration resistance of laminated glass, it is preferred that the polyvinyl acetal resin (1) be a polyvinyl acetal resin (A) with an acetylation degree (a) of less than 8% by mole and an acetalization degree (a) of 65% by mole or more or a polyvinyl acetal resin (B) with an acetylation degree (b) of 8% by mole or more. Each of the polyvinyl acetal resin (2) and the polyvinyl acetal resin (3) may be the polyvinyl acetal resin (A) and may be the polyvinyl acetal resin (B).

The acetylation degree (a) of the polyvinyl acetal resin (A) is less than 8% by mole, preferably 7.9% by mole or less, more preferably 7.8% by mole or less, further preferably 6.5% by mole or less, especially preferably 6% by mole or less, preferably 0.1% by mole or more, more preferably 0.5% by mole or more, further preferably 5% by mole or more and especially preferably 5.5% by mole or more. When the acetylation degree (a) is 0.1% by mole or more and less than 8% by mole, the transfer of a plasticizer can be easily controlled and the sound insulating properties of laminated glass are further heightened.

The acetalization degree (a) of the polyvinyl acetal resin (A) is 65% by mole or more, preferably 66% by mole or more, more preferably 67% by mole or more, further preferably 67.5% by mole or more, especially preferably 75% by mole or more, preferably 85% by mole or less, more preferably 84% by mole or less, further preferably 83% by mole or less and especially preferably 82% by mole or less. When the acetalization degree (a) is the above lower limit or more, the sound insulating properties of laminated glass are further heightened. When the acetalization degree (a) is the above upper limit or less, the reaction time required for producing the polyvinyl acetal resin (A) can be shortened.

The content (a) of the hydroxyl group of the polyvinyl acetal resin (A) is preferably 18% by mole or more, more preferably 19% by mole or more, further preferably 20% by mole or more, especially preferably 21% by mole or more, most preferably 23% by mole or more, preferably 31% by mole or less, more preferably 30% by mole or less, further preferably 29% by mole or less and especially preferably 28% by mole or less. When the content (a) of the hydroxyl group is the above lower limit or more, the adhesive force of the interlayer film is further heightened. When the content (a) of the hydroxyl group is the above upper limit or less, the sound insulating properties of laminated glass are further heightened.

The acetylation degree (b) of the polyvinyl acetal resin (B) is 8% by mole or more, preferably 9% by mole or more, more preferably 9.5% by mole or more, further preferably 10% by mole or more, especially preferably 10.5% by mole or more, preferably 30% by mole or less, more preferably 28% by mole or less, further preferably 26% by mole or less and especially preferably 24% by mole or less. When the acetylation degree (b) is the above lower limit or more, the sound insulating properties of laminated glass are further heightened. When the acetylation degree (b) is the above upper limit or less, the reaction time required for producing the polyvinyl acetal resin (B) can be shortened.

The acetalization degree (b) of the polyvinyl acetal resin (B) is preferably 50% by mole or more, more preferably 53% by mole or more, further preferably 55% by mole or more, especially preferably 60% by mole or more, preferably 78% by mole or less, more preferably 75% by mole or less, further preferably 72% by mole or less and especially preferably 70% by mole or less. When the acetalization degree (b) is the above lower limit or more, the sound insulating properties of laminated glass are further heightened. When the acetalization degree (b) is the above upper limit or less, the reaction time required for producing the polyvinyl acetal resin (B) can be shortened.

The content (b) of the hydroxyl group of the polyvinyl acetal resin (B) is preferably 18% by mole or more, more preferably 19% by mole or more, further preferably 20% by mole or more, especially preferably 21% by mole or more, most preferably 23% by mole or more, preferably 31% by mole or less, more preferably 30% by mole or less, further preferably 29% by mole or less and especially preferably 28% by mole or less. When the content (b) of the hydroxyl group is the above lower limit or more, the adhesive force of the interlayer film is further heightened. When the content (b) of the hydroxyl group is the above upper limit or less, the sound insulating properties of laminated glass are further heightened.

It is preferred that each of the polyvinyl acetal resin (A) and the polyvinyl acetal resin (B) be a polyvinyl butyral resin.

(Plasticizer)

It is preferred that the first layer (including a single-layered interlayer film) contain a plasticizer (hereinafter, sometimes described as a plasticizer (1)). It is preferred that the second layer contain a plasticizer (hereinafter, sometimes described as a plasticizer (2)). It is preferred that the third layer contain a plasticizer (hereinafter, sometimes described as a plasticizer (3)). By the use of the plasticizer or by using a polyvinyl acetal resin and a plasticizer together, the adhesive force of a layer containing the polyvinyl acetal resin and the plasticizer to a lamination glass member or another layer is moderately heightened. The plasticizer is not particularly limited. The plasticizer (1), the plasticizer (2) and the plasticizer (3) may be the same as or different from one another. One kind of each of the plasticizer (1), the plasticizer (2) and the plasticizer (3) may be used alone, and two or more kinds thereof may be used in combination.

Examples of the plasticizer include organic ester plasticizers such as a monobasic organic acid ester and a polybasic organic acid ester, organic phosphate plasticizers such as an organic phosphate plasticizer and an organic phosphite plasticizer, and the like. Of these, organic ester plasticizers are preferred. It is preferred that the plasticizer be a liquid plasticizer.

Examples of the monobasic organic acid ester include a glycol ester obtained by the reaction of a glycol with a monobasic organic acid, and the like. Examples of the glycol include triethylene glycol, tetraethylene glycol, tripropylene glycol, and the like. Examples of the monobasic organic acid include butyric acid, isobutyric acid, caproic acid, 2-ethylbutyric acid, heptanoic acid, n-octylic acid, 2-ethylhexanoic acid, n-nonylic acid, decanoic acid, and the like.

Examples of the polybasic organic acid ester include an ester compound of a polybasic organic acid and an alcohol having a linear or branched structure of 4 to 8 carbon atoms. Examples of the polybasic organic acid include adipic acid, sebacic acid, azelaic acid, and the like.

Examples of the organic ester plasticizer include triethylene glycol di-2-ethylpropanoate, triethylene glycol di-2-ethylbutyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctyl azelate, dibutyl carbitol adipate, ethylene glycol di-2-ethylbutyrate, 1,3-propylene glycol di-2-ethylbutyrate, 1,4-butylene glycol di-2-ethylbutyrate, diethylene glycol di-2-ethylbutyrate, diethylene glycol di-2-ethylhexanoate, dipropylene glycol di-2-ethylbutyrate, triethylene glycol di-2-ethylpentanoate, tetraethylene glycol di-2-ethylbutyrate, diethylene glycol dicaprylate, dihexyl adipate, dioctyl adipate, hexyl cyclohexyl adipate, a mixture of heptyl adipate and nonyl adipate, diisononyl adipate, diisodecyl adipate, heptyl nonyl adipate, dibutyl sebacate, oil-modified sebacic alkyds, a mixture of a phosphoric acid ester and an adipic acid ester, and the like. Organic ester plasticizers other than these may be used. Other adipic acid esters other than the above-described adipic acid esters may be used.

Examples of the organic phosphate plasticizer include tributoxyethyl phosphate, isodecyl phenyl phosphate, triisopropyl phosphate, and the like.

It is preferred that the plasticizer be a diester plasticizer represented by the following formula (1).

[Chemical 1]

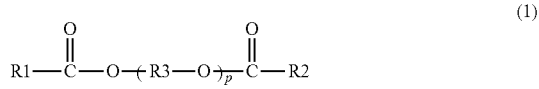

(1)

In the foregoing formula (1), R1 and R2 each represent an organic group with 2 to 10 carbon atoms, R3 represents an ethylene group, an isopropylene group or an n-propylene group, and p represents an integer of 3 to 10. It is preferred that R1 and R2 in the foregoing formula (1) each be an organic group with 5 to 10 carbon atoms, and it is more preferred that R1 and R2 each be an organic group with 6 to 10 carbon atoms.

It is preferred that the plasticizer include triethylene glycol di-2-ethylhexanoate (3GO), triethylene glycol di-2-ethylbutyrate (3GH) or triethylene glycol di-2-ethylpropanoate, it is more preferred that the plasticizer include triethylene glycol di-2-ethylhexanoate or triethylene glycol di-2-ethylbutyrate, and it is further preferred that the plasticizer include triethylene glycol di-2-ethylhexanoate.

Each of the content of the plasticizer (2) (hereinafter, sometimes described as the content (2)) relative to 100 parts by weight of the thermoplastic resin (2) (100 parts by weight of a polyvinyl acetal resin (2) when the thermoplastic resin (2) is the polyvinyl acetal resin (2)) and the content of the plasticizer (3) (hereinafter, sometimes described as the content (3)) relative to 100 parts by weight of the thermoplastic resin (3) (100 parts by weight of a polyvinyl acetal resin (3) when the thermoplastic resin (3) is the polyvinyl acetal resin (3)) is preferably 10 parts by weight or more, more preferably 15 parts by weight or more, preferably 45 parts by weight or less, more preferably 40 parts by weight or less, further preferably 35 parts by weight or less, especially preferably 32 parts by weight or less, and most preferably 30 parts by weight or less. When the content (2) and the content (3) are the above lower limit or more, the flexibility of the interlayer film is enhanced and the handling of the interlayer film is facilitated. When the content (2) and the content (3) are the above upper limit or less, the penetration resistance of laminated glass is further enhanced.

The content of the plasticizer (1) (hereinafter, sometimes described as the content (1)) relative to 100 parts by weight of the thermoplastic resin (1) (100 parts by weight of a polyvinyl acetal resin (1) when the thermoplastic resin (1) is the polyvinyl acetal resin (2)) is preferably 50 parts by weight or more, more preferably 55 parts by weight or more, further preferably 60 parts by weight or more, preferably 90 parts by weight or less, more preferably 85 parts by weight or less, and further preferably 80 parts by weight or less. When the content (1) is the above lower limit or more, the flexibility of the interlayer film is enhanced and the handling of the interlayer film is facilitated. When the content (1) is the above upper limit or less, the penetration resistance of laminated glass is further enhanced.

In the case where the interlayer film is single-layered or the case where the first layer is an outermost layer of the interlayer film, the content of the plasticizer (1) (hereinafter, sometimes described as the content (1)) relative to 100 parts by weight of the thermoplastic resin (1) (100 parts by weight of a polyvinyl acetal resin (1) when the thermoplastic resin (1) is the polyvinyl acetal resin (1)) is preferably 20 parts by weight or more, more preferably 25 parts by weight or more, further preferably 30 parts by weight or more, especially preferably 35 parts by weight or more, preferably 50 parts by weight or less, more preferably 45 parts by weight or less, and further preferably 40 parts by weight or less. When the content (1) is the above lower limit or more, the flexibility of the interlayer film is enhanced and the handling of the interlayer film is facilitated. When the content (1) is the above upper limit or less, the penetration resistance of laminated glass is further enhanced.

For the purpose of heightening the sound insulating properties of laminated glass, it is preferred that the content (1) be larger than the content (2) and it is preferred that the content (1) be larger than the content (3). In particular, from the viewpoint of further heightening the sound insulating properties of laminated glass, each of the absolute value of the difference between the content (2) and the content (1) and the absolute value of the difference between the content (3) and the content (1) is preferably 10 parts by weight or more, more preferably 15 parts by weight or more, and further preferably 20 parts by weight or more. Each of the absolute value of the difference between the content (2) and the content (1) and the absolute value of the difference between the content (3) and the content (1) is preferably 80 parts by weight or less, more preferably 75 parts by weight or less, and further preferably 70 parts by weight or less.

(Heat Shielding Compound)

It is preferred that the interlayer film include a heat shielding compound. It is preferred that the first layer contain a heat shielding compound. It is preferred that the second layer contain a heat shielding compound. It is preferred that the third layer contain a heat shielding compound. One kind of the heat shielding compound may be used alone, and two or more kinds thereof may be used in combination.

Ingredient X:

It is preferred that the interlayer film include at least one kind of Ingredient X among a phthalocyanine compound, a naphthalocyanine compound and an anthracyanine compound. It is preferred that the first layer contain the Ingredient X. It is preferred that the second layer contain the Ingredient X. It is preferred that the third layer contain the Ingredient X. The Ingredient X is a heat shielding compound. One kind of the Ingredient X may be used alone, and two or more kinds thereof may be used in combination.

The Ingredient X is not particularly limited. As the Ingredient X, conventionally known phthalocyanine compound, naphthalocyanine compound and anthracyanine compound can be used.

With regard to the interlayer film and laminated glass, from the viewpoint of further enhancing the heat shielding properties thereof, it is preferred that the Ingredient X be at least one kind selected from the group consisting of phthalocyanine, a derivative of phthalocyanine, naphthalocyanine and a derivative of naphthalocyanine, and it is more preferred that the Ingredient X be at least one kind among phthalocyanine and a derivative of phthalocyanine.

From the viewpoints of effectively enhancing the heat shielding properties and maintaining the visible light transmittance at a higher level over a long period of time, it is preferred that the Ingredient X contain vanadium atoms or copper atoms. It is preferred that the Ingredient X contain vanadium atoms and it is also preferred that the Ingredient X contain copper atoms. It is more preferred that the Ingredient X be at least one kind among phthalocyanine containing vanadium atoms or copper atoms and a derivative of phthalocyanine containing vanadium atoms or copper atoms. With regard to the interlayer film and laminated glass, from the viewpoint of still further enhancing the heat shielding properties thereof, it is preferred that the Ingredient X have a structural unit in which an oxygen atom is bonded to a vanadium atom.

In 100% by weight of a layer containing the Ingredient X (a first layer, a second layer or a third layer), the content of the Ingredient X is preferably 0.001% by weight or more, more preferably 0.005% by weight or more, further preferably 0.01% by weight or more, especially preferably 0.02% by weight or more, preferably 0.2% by weight or less, more preferably 0.1% by weight or less, further preferably 0.05% by weight or less and especially preferably 0.04% by weight or less. When the content of the Ingredient X is the above lower limit or more and the above upper limit or less, the heat shielding properties are sufficiently enhanced and the visible light transmittance is sufficiently heightened. For example, it is possible to make the visible light transmittance 70% or more.

Heat Shielding Particles:

It is preferred that the interlayer film include heat shielding particles. It is preferred that the first layer contain the heat shielding particles. It is preferred that the second layer contain the heat shielding particles. It is preferred that the third layer contain the heat shielding particles. The heat shielding particle is of a heat shielding compound. By the use of heat shielding particles, infrared rays (heat rays) can be effectively cut off. One kind of the heat shielding particles may be used alone, and two or more kinds thereof may be used in combination.

From the viewpoint of further heightening the heat shielding properties of laminated glass, it is more preferred that the heat shielding particles be metal oxide particles. It is preferred that the heat shielding particle be a particle (a metal oxide particle) formed from an oxide of a metal.

The energy amount of an infrared ray with a wavelength of 780 nm or longer which is longer than that of visible light is small as compared with an ultraviolet ray. However, the thermal action of infrared rays is large, and when infrared rays are absorbed into a substance, heat is released from the substance. As such, infrared rays are generally called heat rays. By the use of the heat shielding particles, infrared rays (heat rays) can be effectively cut off. In this connection, the heat shielding particle means a particle capable of absorbing infrared rays.

Specific examples of the heat shielding particles include metal oxide particles such as aluminum-doped tin oxide particles, indium-doped tin oxide particles, antimony-doped tin oxide particles (ATO particles), gallium-doped zinc oxide particles (GZO particles), indium-doped zinc oxide particles (IZO particles), aluminum-doped zinc oxide particles (AZO particles), niobium-doped titanium oxide particles, sodium-doped tungsten oxide particles, cesium-doped tungsten oxide particles, thallium-doped tungsten oxide particles, rubidium-doped tungsten oxide particles, tin-doped indium oxide particles (ITO particles), tin-doped zinc oxide particles and silicon-doped zinc oxide particles, lanthanum hexaboride ($LaB_6$) particles, and the like. Heat shielding particles other than these may be used. Of these, since the heat ray shielding function is high, preferred are metal oxide particles, more preferred are ATO particles, GZO particles, IZO particles, ITO particles or tungsten oxide particles, and especially preferred are ITO particles or tungsten oxide particles. In particular, since the heat ray shielding function is high and the particles are readily available, preferred are tin-doped indium oxide particles (ITO particles), and also preferred are tungsten oxide particles.

With regard to the interlayer film and laminated glass, from the viewpoint of further enhancing the heat shielding properties thereof, it is preferred that the tungsten oxide particles be metal-doped tungsten oxide particles. Examples of the "tungsten oxide particles" include metal-doped tungsten oxide particles. Specifically, examples of the metal-doped tungsten oxide particles include sodium-doped tungsten oxide particles, cesium-doped tungsten oxide particles, thallium-doped tungsten oxide particles, rubidium-doped tungsten oxide particles, and the like.

With regard to the interlayer film and laminated glass, from the viewpoint of further enhancing the heat shielding properties thereof, cesium-doped tungsten oxide particles are especially preferred. With regard to the interlayer film and laminated glass, from the viewpoint of still further enhancing the heat shielding properties thereof, it is preferred that the cesium-doped tungsten oxide particles be tungsten oxide particles represented by the formula: $Cs_{0.33}WO_3$.

The average particle diameter of the heat shielding particles is preferably 0.01 μm or more, more preferably 0.02 μm or more, preferably 0.1 μm or less and more preferably 0.05 μm or less. When the average particle diameter is the above lower limit or more, the heat ray shielding properties are sufficiently heightened. When the average particle diameter is the above upper limit or less, the dispersibility of heat shielding particles is enhanced.

The "average particle diameter" refers to the volume average particle diameter. The average particle diameter can be measured using a particle size distribution measuring apparatus ("UPA-EX150" available from NIKKISO CO., LTD.), or the like.

In 100% by weight of a layer containing the heat shielding particles (a first layer, a second layer or a third layer), each content of the heat shielding particles is preferably 0.01% by weight or more, more preferably 0.1% by weight or more, further preferably 1% by weight or more, especially preferably 1.5% by weight or more, preferably 6% by weight or less, more preferably 5.5% by weight or less, further preferably 4% by weight or less, especially preferably 3.5% by weight or less and most preferably 3% by weight or less. When the content of the heat shielding particles is the above lower limit or more and the above upper limit or less, the heat shielding properties are sufficiently enhanced and the visible light transmittance is sufficiently heightened.

(Metal Salt)

It is preferred that the interlayer film contain at least one kind of metal salt (hereinafter, sometimes described as Metal salt M) among a magnesium salt, an alkali metal salt, and an alkaline earth metal salt. It is preferred that the first layer contain the Metal salt M. It is preferred that the second layer contain the Metal salt M. It is preferred that the third layer contain the Metal salt M. By the use of the Metal salt M, controlling the adhesivity between the interlayer film and a lamination glass member or the adhesivity between respective layers in the interlayer film is facilitated. One kind of the Metal salt M may be used alone and two or more kinds thereof may be used in combination.

It is preferred that the Metal salt M contain at least one kind of metal selected from the group consisting of Li, Na, K, Rb, Cs, Mg, Ca, Sr, and Ba. It is preferred that the metal salt contained in the interlayer film contain at least one kind of metal between K and Mg.

Moreover, it is more preferred that the Metal salt M be an alkali metal salt of an organic acid with 2 to 16 carbon atoms or an alkaline earth metal salt of an organic acid with 2 to 16 carbon atoms and it is further preferred that the Metal salt M be a magnesium carboxylate with 2 to 16 carbon atoms or a potassium carboxylate with 2 to 16 carbon atoms.

Although the magnesium carboxylate with 2 to 16 carbon atoms and the potassium carboxylate with 2 to 16 carbon atoms are not particularly limited, examples thereof include magnesium acetate, potassium acetate, magnesium propionate, potassium propionate, magnesium 2-ethylbutyrate, potassium 2-ethylbutanoate, magnesium 2-ethylhexanoate, potassium 2-ethylhexanoate, and the like.

The total of the contents of Mg and K in a layer containing the Metal salt M (a first layer, a second layer, or a third layer) is preferably 5 ppm or more, more preferably 10 ppm or more, further preferably 20 ppm or more, preferably 300 ppm or less, more preferably 250 ppm or less, and further preferably 200 ppm or less. When the total of the contents of Mg and K is the above lower limit or more and the above upper limit or less, the adhesivity between the interlayer film and a lamination glass member or the adhesivity between respective layers in the interlayer film can be further well controlled.

(Ultraviolet ray screening agent)

It is preferred that the interlayer film include an ultraviolet ray screening agent. It is preferred that the first layer contain an ultraviolet ray screening agent. It is preferred that the second layer contain an ultraviolet ray screening agent. It is preferred that the third layer contain an ultraviolet ray screening agent. By the use of an ultraviolet ray screening agent, even when the interlayer film and the laminated glass are used for a long period of time, the visible light transmittance becomes further difficult to be lowered. One kind of the ultraviolet ray screening agent may be used alone, and two or more kinds thereof may be used in combination.

Examples of the ultraviolet ray screening agent include an ultraviolet ray absorber. It is preferred that the ultraviolet ray screening agent be an ultraviolet ray absorber.

Examples of the ultraviolet ray screening agent include an ultraviolet ray screening agent containing a metal atom, an ultraviolet ray screening agent containing a metal oxide, an ultraviolet ray screening agent having a benzotriazole structure, an ultraviolet ray screening agent having a benzophenone structure, an ultraviolet ray screening agent having a triazine structure, an ultraviolet ray screening agent having a malonic acid ester structure, an ultraviolet ray screening agent having an oxanilide structure, an ultraviolet ray screening agent having a benzoate structure, and the like.

Examples of the ultraviolet ray screening agent containing a metal atom include platinum particles, particles in which the surface of platinum particles is coated with silica, palladium particles, particles in which the surface of palladium particles is coated with silica, and the like. It is preferred that the ultraviolet ray screening agent not be heat shielding particles.

The ultraviolet ray screening agent is preferably an ultraviolet ray screening agent having a benzotriazole structure, an ultraviolet ray screening agent having a benzophenone structure, an ultraviolet ray screening agent having a triazine structure or an ultraviolet ray screening agent having a benzoate structure, more preferably an ultraviolet ray screening agent having a benzotriazole structure or an ultraviolet ray screening agent having a benzophenone structure, and further preferably an ultraviolet ray screening agent having a benzotriazole structure.

Examples of the ultraviolet ray screening agent containing a metal oxide include zinc oxide, titanium oxide, cerium oxide, and the like. Furthermore, with regard to the ultraviolet ray screening agent containing a metal oxide, the surface thereof may be coated with any material. Examples of the coating material for the surface of the ultraviolet ray screening agent containing a metal oxide include an insulating metal oxide, a hydrolyzable organosilicon compound, a silicone compound, and the like.

Examples of the ultraviolet ray screening agent having a benzotriazole structure include ultraviolet ray screening agents having a benzotriazole structure such as 2-(2'-hydroxy-5'-methylphenyl)benzotriazole ("Tinuvin P" available from BASF Japan Ltd.), 2-(2'-hydroxy-3',5'-di-t-butylphenyl)benzotriazole ("Tinuvin 320" available from BASF Japan Ltd.), 2-(2'-hydroxy-3'-t-butyl-5-methylphenyl)-5-chlorobenzotriazole ("Tinuvin 326" available from BASF Japan Ltd.) and 2-(2'-hydroxy-3',5'-di-amylphenyl)benzotriazole ("Tinuvin 328" available from BASF Japan Ltd.). It is preferred that the ultraviolet ray screening agent be an ultraviolet ray screening agent having a benzotriazole structure containing a halogen atom, and it is more preferred that the ultraviolet ray screening agent be an ultraviolet ray screening agent having a benzotriazole structure containing a chlorine atom, because those are excellent in ultraviolet ray absorbing performance.

Examples of the ultraviolet ray screening agent having a benzophenone structure include octabenzone ("Chimassorb 81" available from BASF Japan Ltd.), and the like.

Examples of the ultraviolet ray screening agent having a triazine structure include "LA-F70" available from ADEKA CORPORATION, 2-(4,6-diphenyl-1,3,5-triazine-2-yl)-5-[(hexyl)oxy]-phenol ("Tinuvin 1577FF" available from BASF Japan Ltd.), and the like.

Examples of the ultraviolet ray screening agent having a malonic acid ester structure include dimethyl(p-methoxybenzylidene)malonate, tetraethyl-2,2-(1,4-phenylenedimethylidene)bismalonate, 2-(p-methoxybenzylidene)-bis(1,2,2,6,6-pentamethyl-4-piperidinyl)malonate, and the like.

Examples of a commercial product of the ultraviolet ray screening agent having a malonic acid ester structure include Hostavin B-CAP, Hostavin PR-25 and Hostavin PR-31 (any of these is available from Clariant Japan K.K.).

Examples of the ultraviolet ray screening agent having an oxanilide structure include a kind of oxalic acid diamide having a substituted aryl group and the like on the nitrogen atom such as N-(2-ethylphenyl)-N'-(2-ethoxy-5-t-butylphenyl)oxalic acid diamide, N-(2-ethylphenyl)-N'-(2-ethoxyphenyl)oxalic acid diamide and 2-ethyl-2'-ethoxy-oxanilide ("Sanduvor VSU" available from Clariant Japan K.K.).

Examples of the ultraviolet ray screening agent having a benzoate structure include 2,4-di-tert-butylphenyl-3,5-di-tert-butyl-4-hydroxybenzoate ("Tinuvin 120" available from BASF Japan Ltd.), and the like.

From the viewpoint of further suppressing the lowering in visible light transmittance after the lapse of a certain period of time, in 100% by weight of a layer containing the ultraviolet ray screening agent (a first layer, a second layer or a third layer), the content of the ultraviolet ray screening agent is preferably 0.1% by weight or more, more preferably 0.2% by weight or more, further preferably 0.3% by weight or more, especially preferably 0.5% by weight or more, preferably 2.5% by weight or less, more preferably 2% by weight or less, further preferably 1% by weight or less and especially preferably 0.8% by weight or less. In particular, by setting the content of the ultraviolet ray screening agent to be 0.2% by weight or more in 100% by weight of a layer containing the ultraviolet ray screening agent, with regard to the interlayer film and laminated glass, the lowering in visible light transmittance thereof after the lapse of a certain period of time can be significantly suppressed.

(Oxidation Inhibitor)

It is preferred that the interlayer film include an oxidation inhibitor. It is preferred that the first layer contain an oxidation inhibitor. It is preferred that the second layer contain an oxidation inhibitor. It is preferred that the third layer contain an oxidation inhibitor. One kind of the oxidation inhibitor may be used alone, and two or more kinds thereof may be used in combination.

Examples of the oxidation inhibitor include a phenol-based oxidation inhibitor, a sulfur-based oxidation inhibitor, a phosphorus-based oxidation inhibitor, and the like. The phenol-based oxidation inhibitor is an oxidation inhibitor having a phenol skeleton. The sulfur-based oxidation inhibitor is an oxidation inhibitor containing a sulfur atom. The phosphorus-based oxidation inhibitor is an oxidation inhibitor containing a phosphorus atom.

It is preferred that the oxidation inhibitor be a phenol-based oxidation inhibitor or a phosphorus-based oxidation inhibitor.

Examples of the phenol-based oxidation inhibitor include 2,6-di-t-butyl-p-cresol (BHT), butylated hydroxyanisole (BHA), 2,6-di-t-butyl-4-ethylphenol, stearyl β-(3,5-di-t-butyl-4-hydroxyphenyl)propionate, 2,2'-methylenebis-(4-methyl-6-butylphenol), 2,2'-methylenebis-(4-ethyl-6-t-butylphenol), 4,4'-butylidene-bis-(3-methyl-6-t-butylphenol), 1,1,3-tris-(2-methyl-hydroxy-5-t-butylphenyl)butane, tetrakis[methylene-3-(3',5'-butyl-4-hydroxyphenyl)propionate] methane, 1,3,3-tris-(2-methyl-4-hydroxy-5-t-butylphenol) butane, 1,3,5-trimethyl-2,4,6-tris(3,5-di-t-butyl-4-hydroxybenzyl)benzene, bis(3,3'-t-butylphenol)butyric acid glycol ester, bis(3-t-butyl-4-hydroxy-5-methylbenzenepropanoic acid)ethylenebis(oxyethylene), and the like. One kind or two or more kinds among these oxidation inhibitors are suitably used.

Examples of the phosphorus-based oxidation inhibitor include tridecyl phosphite, tris(tridecyl) phosphite, triphenyl phosphite, trinonylphenyl phosphite, bis(tridecyl)pentaerithritol diphosphite, bis(decyl)pentaerithritol diphosphite, tris(2,4-di-t-butylphenyl) phosphite, bis(2,4-di-t-butyl-6-methylphenyl)ethyl ester phosphorous acid, tris(2,4-di-t-butylphenyl) phosphite, 2,2'-methylenebis(4,6-di-t-butyl-1-phenyloxy)(2-ethylhexyloxy)phosphorus, and the like. One kind or two or more kinds among these oxidation inhibitors are suitably used.

Examples of a commercial product of the oxidation inhibitor include "IRGANOX 245" available from BASF Japan Ltd., "IRGAFOS 168" available from BASF Japan Ltd., "IRGAFOS 38" available from BASF Japan Ltd., "Sumilizer BHT" available from Sumitomo Chemical Co., Ltd., "IRGANOX 1010" available from BASF Japan Ltd., and the like.

With regard to the interlayer film and laminated glass, in order to maintain high visible light transmittance thereof over a long period of time, it is preferred that the content of the oxidation inhibitor be 0.1% by weight or more in 100% by weight of the interlayer film or in 100% by weight of the layer containing the oxidation inhibitor (a first layer, a second layer or a third layer). Moreover, since an effect commensurate with the addition of an oxidation inhibitor is not attained, it is preferred that the content of the oxidation inhibitor be 2% by weight or less in 100% by weight of the interlayer film or in 100% by weight of the layer containing the oxidation inhibitor.

(Other Ingredients)

Each of the first layer, the second layer and the third layer may contain additives such as a coupling agent containing silicon, aluminum or titanium, a dispersing agent, a surfactant, a flame retardant, an antistatic agent, a pigment, a dye, an adhesive force regulating agent, a moisture-resistance improving agent, a fluorescent brightening agent and an infrared ray absorber, as necessary. One kind of these additives may be used alone, and two or more kinds thereof may be used in combination.

(Other Details of Interlayer Film for Laminated Glass)

The thickness of the interlayer film is not particularly limited. From the viewpoint of the practical aspect and the viewpoint of sufficiently enhancing the penetration resistance of laminated glass, the thickness of the interlayer film is preferably 0.1 mm or more, more preferably 0.25 mm or more, preferably 3 mm or less and more preferably 1.5 mm or less. When the thickness of the interlayer film is the above lower limit or more, the penetration resistance of laminated glass is enhanced. When the thickness of the interlayer film is the above upper limit or less, the transparency of the interlayer film is further improved.

It is preferred that the interlayer film be obtained by melt extrusion molding.

The production method of the interlayer film is not particularly limited. In the case of a single-layered interlayer film, examples of the production method of the interlayer film include a method of extruding a resin composition with an extruder. In the case of a multi-layered interlayer film, examples of the production method of the interlayer film include a method of separately forming respective resin compositions used for constituting respective layers into respective layers, and then, for example, layering the respective obtained layers, a method of coextruding respective resin compositions used for constituting respective layers with an extruder and layering the respective layers, and the like. A production method of extrusion-molding is preferred because the method is suitable for continuous production.

Since the production efficiency of the interlayer film is excellent, it is preferred that respective polyvinyl acetal resins contained in the second layer and the third layer be the same as each other, it is more preferred that respective polyvinyl acetal resins contained in the second layer and the third layer be the same as each other and respective plasticizers contained therein be the same as each other, and it is further preferred that the second layer and the third layer be formed from the same resin composition as each other.

(Laminated Glass)

FIG. 3 is a sectional view schematically showing an example of laminated glass prepared with the interlayer film for laminated glass shown in FIG. 1.

The laminated glass 31 shown in FIG. 3 is provided with a first lamination glass member 21, a second lamination glass member 22, and an interlayer film 11. The interlayer film 11 is arranged between the first lamination glass member 21 and the second lamination glass member 22 to be sandwiched therebetween.

The first lamination glass member 21 is layered on a first surface 11a of the interlayer film 11. The second lamination glass member 22 is layered on a second surface 11b opposite to the first surface 11a of the interlayer film 11. The first lamination glass member 21 is layered on an outer surface 2a of a second layer 2. The second lamination glass member 22 is layered on an outer surface 3a of a third layer 3.

FIG. 4 is a sectional view schematically showing an example of laminated glass prepared with the interlayer film for laminated glass shown in FIG. 2

The laminated glass 31A shown in FIG. 4 is provided with a first lamination glass member 21, a second lamination glass member 22, and an interlayer film 11A. The interlayer film 11A is arranged between the first lamination glass member 21 and the second lamination glass member 22 to be sandwiched therebetween.

The first lamination glass member 21 is layered on a first surface 11a of the interlayer film 11A. The second lamination glass member 22 is layered on a second surface 11b opposite to the first surface 11a of the interlayer film 11A.

As described above, the laminated glass is provided with a first lamination glass member, a second lamination glass member, and an interlayer film and the interlayer film is the interlayer film for laminated glass according to the present invention. In the laminated glass, the above-mentioned interlayer film is arranged between the first lamination glass member and the second lamination glass member.

Examples of the lamination glass member include a glass plate, a PET (polyethylene terephthalate) film, and the like. As the laminated glass, laminated glass in which an interlayer film is sandwiched between a glass plate and a PET film or the like, as well as laminated glass in which an interlayer film is sandwiched between two glass plates, is included. The laminated glass is a laminate provided with a glass plate, and it is preferred that at least one glass plate be used. It is preferred that each of the first lamination glass member and the second lamination glass member be a glass plate or a PET film, and the laminated glass be provided with a glass plate as at least one among the first lamination glass member and the second lamination glass member. It is preferred that both of the first lamination glass member and the second lamination glass member be glass plates (a first glass plate and a second glass plate). The interlayer film is arranged between a first glass plate and a second glass plate to suitably obtain laminated glass.

Examples of the glass plate include a sheet of inorganic glass and a sheet of organic glass. Examples of the inorganic glass include float plate glass, heat ray-absorbing plate glass, heat ray-reflecting plate glass, polished plate glass, figured glass, wired plate glass, and the like. The organic glass is synthetic resin glass substituted for inorganic glass. Examples of the organic glass include a polycarbonate plate, a poly(meth)acrylic resin plate, and the like. Examples of the poly(meth)acrylic resin plate include a polymethyl (meth) acrylate plate, and the like.

The thickness of the lamination glass member is preferably 1 mm or more, preferably 5 mm or less, and more preferably 3 mm or less. Moreover, when the lamination glass member is a glass plate, the thickness of the glass plate is preferably 0.5 mm or more, more preferably 0.7 mm or more, preferably 5 mm or less, and more preferably 3 mm or less. When the lamination glass member is a PET film, the thickness of the PET film is preferably 0.03 mm or more and preferably 0.5 mm or less.

The method for producing the laminated glass is not particularly limited. For example, the interlayer film is sandwiched between the first lamination glass member and the second lamination glass member, and then, passed through pressure rolls or subjected to decompression suction in a rubber bag, so that the air remaining between the first and the second lamination glass members and the interlayer film is removed. Afterward, the members are preliminarily bonded together at about 70 to 110° C. to obtain a laminate. Next, by putting the laminate into an autoclave or by pressing the laminate, the members are press-bonded together at about 120 to 150° C. and under a pressure of 1 to 1.5 MPa. In this way, laminated glass can be obtained. At the time of producing the laminated glass, a first layer, a second layer and a third layer may be layered.

Each of the interlayer film and the laminated glass can be used for automobiles, railway vehicles, aircraft, ships, buildings and the like. Each of the interlayer film and the laminated glass can also be used for applications other than these applications. It is preferred that the interlayer film and the laminated glass be an interlayer film and laminated glass for vehicles or for building respectively, and it is more preferred that the interlayer film and the laminated glass be an interlayer film and laminated glass for vehicles respectively. Each of the interlayer film and the laminated glass can be used for a windshield, side glass, rear glass or roof glass of an automobile, and the like. The interlayer film and the laminated glass are suitably used for automobiles. The interlayer film is used for obtaining laminated glass of an automobile.

From the viewpoint of obtaining laminated glass further excellent in transparency, the visible light transmittance of laminated glass is preferably 65% or more and more preferably 70% or more. The visible light transmittance of laminated glass can be measured in accordance with JIS R3211 (1998). It is preferred that the visible light transmittance of laminated glass obtained by sandwiching the interlayer film for laminated glass according to the present invention between two sheets of green glass (heat ray-absorbing plate glass) with a thickness of 2 mm in accordance with JIS R3208 be 70% or more. The visible light transmittance is more preferably 75% or more.

Hereinafter, the present invention will be described in more detail with reference to examples. The present invention is not limited only to these examples.

Example 1

Preparation of Interlayer Film:

One hundred parts by weight of a polyvinyl acetal resin (being prepared with n-butyraldehyde, the average polymerization degree of 1700, the content of the hydroxyl group of 30% by mole, the acetylation degree of 1% by mole, the acetalization degree of 69% by mole), 40 parts by weight of a plasticizer (3GO), 0.2 parts by weight of an ultraviolet ray screening agent (Tinuvin 326), and 0.2 parts by weight of an oxidation inhibitor (BHT) were mixed to obtain a composition.

The obtained composition was extruded using an extruder to prepare an interlayer film (760 μm in thickness). The extruded film was immersed in water at 40° C. for 1 minute with the use of a water tank to be cooled and the cooled film in a state of being applied with substantially no tensile force (in a non-tension state) was subjected to an annealing treatment (relaxation treatment) for 1 minute at 130° C. to obtain an interlayer film for laminated glass.

Preparation of Laminated Glass:

The interlayer film (760 μm in thickness) obtained was arranged between two sheets of transparent float plate glass (5 cm in longitudinal length×5 cm in transversal length×2.5 mm in thickness) and fixed by the use of a heat resistant tape so as not to be positionally displaced to obtain a laminate. In this connection, the laminate was prepared so that the longitudinal direction and the MD direction of the interlayer film become parallel to each other and the transversal direction and the TD direction become parallel to each other.

The obtained laminate was installed in a vacuum bag and the inside of the vacuum bag was degassed for 10 minutes at a degree of vacuum of 933.2 hPa and at ordinary temperature (23° C.) Subsequently, the temperature inside the vacuum bag was elevated to 85° C. while maintaining the degassed state, the vacuum bag was allowed to spontaneously cool at the point of time when the temperature reached 85° C., and it was confirmed that the temperature was lowered to 30° C., after which the pressure was released to the atmosphere.

The laminated glass preliminarily press-bonded by the above-mentioned vacuum bag method was press-bonded for 20 minutes under conditions of 135° C. and a pressure of 1.2 MPa using an autoclave to obtain a sheet of laminated glass.

Examples 2 to 8 and Comparative Example 1

An interlayer film and a sheet of laminated glass were prepared in the same manner as that in Example 1 except that the kind of each of the polyvinyl acetal resin, the plasticizer, and the heat shielding compound, the blending amount thereof, the condition for cooling after extrusion, and the condition for a relaxation treatment after cooling were set to those described in Table 1. In this connection, ITO represents indium tin oxide particles (heat shielding particles). The heat shielding compound in an amount that the content of the heat shielding compound in 100% by weight of the resulting interlayer film becomes a numerical value shown in Table 1 was used.

Example 9

Preparation of Composition for Forming First Layer:

One hundred parts by weight of a polyvinyl acetal resin (being prepared with n-butyraldehyde, the average polymerization degree of 2300, the content of the hydroxyl group of 23% by mole, the acetylation degree of 12% by mole, the acetalization degree of 65% by mole), a plasticizer (3GO) in an amount that the content thereof in the resulting interlayer film becomes 40 parts by weight relative to 100 parts by weight of the polyvinyl acetal resin (an amount that the content thereof becomes 60 parts by weight relative to 100 parts by weight of the polyvinyl acetal resin in the first layer), 0.2 parts by weight of an ultraviolet ray screening agent (Tinuvin 326), and 0.2 parts by weight of an oxidation inhibitor (BHT) were mixed to obtain a composition for forming a first layer.

Preparation of Composition for Forming Second Layer and Third Layer:

One hundred parts by weight of a polyvinyl acetal resin (the average polymerization degree of 1700, the content of the hydroxyl group of 30% by mole, the acetylation degree of 1% by mole, the acetalization degree of 69% by mole), a plasticizer (300) in an amount that the content thereof in the resulting interlayer film becomes 40 parts by weight relative to 100 parts by weight of the polyvinyl acetal resin, 0.2 parts by weight of an ultraviolet ray screening agent (Tinuvin 326), and 0.2 parts by weight of an oxidation inhibitor (BHT) were mixed to obtain a composition for forming a second layer and a third layer.

The composition for forming a first layer and the composition for forming a second layer and a third layer were coextruded using a coextruder. An interlayer film having a layered structure with a stack of a second layer/a first layer/a third layer was prepared.

A sheet of laminated glass was obtained in the same manner as that in Example 1 except that the interlayer film obtained was used.

Examples 10 to 17

An interlayer film and a sheet of laminated glass were prepared in the same manner as that in Example 9 except that the kind of each of the polyvinyl acetal resin, the plasticizer, and the heat shielding compound, the blending amount thereof, the condition for cooling after extrusion, and the condition for a relaxation treatment after cooling were set to those described in Table 2. In this connection, ITO represents indium tin oxide particles (heat shielding particles) and Phthalocyanine represents vanadyl phthalocyanine (a phthalocyanine compound containing a vanadium atom). The heat shielding compound in an amount that the content of the heat shielding compound in 100% by weight of the resulting interlayer film becomes a numerical value shown in Table 2 was used.

(Evaluation)

(1) Birefringence Index

The interlayer film obtained was measured for the birefringence index by the method described above.

(2) Protrusion from End Part

With regard to a sheet of laminated glass prepared as above, by observing the laminated glass obtained, interlayer film portions in the TD direction and MD direction were measured for the protrusion distance. In this connection, when an interlayer film portion shrinks at an end part of laminated glass, the distance was evaluated as "-".

The details and the results are shown in the following Tables 1 and 2. In general, when an interlayer film is heated, there is a tendency for the interlayer film to expand in the TD direction. However, in Examples 1 to 17, as compared with Comparative Example 1, protrusion of the interlayer film to the TD direction was successfully suppressed.

TABLE 1

|  |  |  | Example 1 | Example 2 | Example 3 | Example 4 | Comparative Example 1 | Example 5 | Example 6 | Example 7 | Example 8 |
|---|---|---|---|---|---|---|---|---|---|---|---|
| Polyvinyl acetal resin | Content of hydroxyl group | mol % | 30 | 30 | 30 | 30 | 30 | 30 | 30.5 | 30 | 30 |
|  | Acetylation degree | mol % | 1 | 1 | 1 | 1 | 1 | 1 | 1.3 | 0.7 | 1 |
|  | Content | Parts by weight | 100 | 100 | 100 | 100 | 100 | 100 | 100 | 100 | 100 |
| Plasticizer | Kind | — | — | 3GO | 3GO | 3GO | 3GO | 3GO | 3GO | 3GO | 3GO |
|  | Content | Parts by weight | 40 | 33 | 40 | 33 | 40 | 40 | 40 | 40 | 40 |
| Heat shielding compound | Kind | — | — | — | — | — | — | — | — | — | ITO |
|  | Content | % by weight | — | — | — | — | — | — | — | — | 0.15 |
| Production conditions for interlayer film | Cooling after extrusion | Cooling means | Water bath | Water bath | Water bath | Water bath | Water bath | Water bath | Water bath | Water bath | Water bath |
|  |  | Cooling temperature °C. | 40 | 40 | 40 | 20 | 20 | 40 | 40 | 40 | 40 |
|  |  | Cooling time Minute | 1 | 1 | 1 | 1 | 1 | 1 | 1 | 1 | 1 |
|  | Relaxation treatment after cooling | Treatment mode | Non-tension mode | Non-tension mode | Non-tension mode | Non-tension mode | Tension mode | Non-tension mode | Non-tension mode | Tension mode | Non-tension mode |
|  |  | Treatment temperature °C. | 130 | 40 | 40 | 40 | — | 130 | 50 | — | 130 |
|  |  | Treatment time Minute | 1 | 30 | 30 | 20 | — | 2 | 30 | — | 1 |
| Birefringence index | $\Delta_n$ MDA | ×10$^{-3}$ | 0.053 | 0.072 | 0.135 | 0.138 | 0.284 | 0.039 | 0.105 | 0.090 | 0.044 |
|  | $\Delta_n$ MDB | ×10$^{-3}$ | 0.043 | 0.029 | 0.082 | 0.117 | 0.227 | 0.014 | 0.087 | 0.075 | 0.019 |
|  | $\Delta_n$ MDC | ×10$^{-3}$ | 0.036 | 0.065 | 0.118 | 0.125 | 0.272 | 0.024 | 0.077 | 0.039 | 0.027 |
|  | $\Delta_n$ TDA | ×10$^{-3}$ | 0.075 | 0.113 | 0.089 | 0.118 | 0.100 | 0.025 | 0.036 | 0.112 | 0.040 |
|  | $\Delta_n$ TDB | ×10$^{-3}$ | 0.062 | 0.097 | 0.069 | 0.084 | 0.067 | 0.013 | 0.008 | 0.049 | 0.018 |
|  | $\Delta_n$ TDC | ×10$^{-3}$ | 0.056 | 0.083 | 0.054 | 0.074 | 0.086 | 0.039 | 0.038 | 0.025 | 0.020 |
|  | $\Delta_n$MDMAX | ×10$^{-3}$ | 0.016 | 0.006 | 0.016 | 0.013 | 0.012 | 0.016 | 0.028 | 0.051 | 0.017 |
|  | $\Delta_n$TDMAX | ×10$^{-3}$ | 0.019 | 0.030 | 0.035 | 0.044 | 0.013 | 0.026 | 0.030 | 0.087 | 0.021 |
|  | $\Delta_n$MDMAX + $\Delta_n$TDMAX | ×10$^{-3}$ | 0.035 | 0.036 | 0.051 | 0.057 | 0.025 | 0.042 | 0.057 | 0.138 | 0.038 |
| Protrusion from end part (vacuum bag) | MD direction | mm | −0.50 | −0.80 | 0.30 | 0.00 | −1.50 | −0.10 | −0.20 | −0.10 | −0.10 |
|  | TD direction | mm | −0.50 | 1.00 | 1.00 | 1.00 | 1.30 | 0.00 | 0.10 | 0.20 | 0.00 |

TABLE 2

|  |  |  |  | Example 9 | Example 10 | Example 11 | Example 12 | Example 13 | Example 14 | Example 15 | Example 16 | Example 17 |
|---|---|---|---|---|---|---|---|---|---|---|---|---|
| Second and third layers | Polyvinyl acetal resin | Content of hydroxyl group | mol % | 30 | 30 | 30 | 30 | 30 | 30 | 30 | 30 | 30.5 |
|  |  | Acetylation degree | mol % | 1 | 1 | 1 | 1 | 1 | 1 | 1 | 1 | 1.3 |
| First layer | Polyvinyl acetal resin | Content of hydroxyl group | mol % | 23 | 23 | 23 | 23 | 23 | 23 | 23 | 23 | 23 |
|  |  | Acetylation degree | mol % | 12 | 12 | 12 | 12 | 12 | 6 | 12 | 12 | 6 |
| Whole interlayer film | Polyvinyl acetal resin | Content | Parts by weight | 100 | 100 | 100 | 100 | 100 | 100 | 100 | 100 | 100 |
|  | Plasticizer | Kind 1 | — | 3GO | 3GO | 3GO | 3GO | 3GO | 3GO | 3GO | 3GO | 3GO |
|  |  | Content | Parts by weight | 40 | 40 | 40 | 40 | 40 | 36 | 40 | 40 | 40 |
|  |  | Kind 2 | — | — | — | — | — | — | D931 | — | — | — |
|  |  | Content | Parts by weight | — | — | — | — | — | 4 | — | — | — |
|  | Heat shielding compound | Kind 1 | — | — | — | — | ITO | ITO | — | — | — | — |
|  |  | Content | % by weight | — | — | — | 0.15 | 0.15 | — | — | — | — |
|  |  | Kind 2 | — | — | — | — | — | Phthalocyanine | — | — | — | — |
|  |  | Content | % by weight | — | — | — | — | 0.01 | — | — | — | — |
| Production conditions for interlayer film | Cooling after extrusion | Cooling means | — | Water bath | Water bath | Water bath | Water bath | Water bath | Water bath | Water bath | Water bath | Water bath |
|  |  | Cooling temperature | °C. | 40 | 40 | 40 | 40 | 40 | 40 | 40 | 40 | 30 |
|  |  | Cooling time | Minute | 1 | 1 | 1 | 1 | 1 | 1 | 1 | 1 | 1 |
|  | Relaxation treatment | Treatment mode | — | Non-tension | Non-tension | Non-tension | Non-tension | Non-tension | Non-tension | Non-tension | Non-tension | Tension mode |

TABLE 2-continued

|  |  |  | Example 9 | Example 10 | Example 11 | Example 12 | Example 13 | Example 14 | Example 15 | Example 16 | Example 17 |
|---|---|---|---|---|---|---|---|---|---|---|---|
|  | after cooling | Treatment temperature °C. | mode 40 | mode 40 | mode 140 | mode 130 | mode 130 | mode 130 | mode 120 | mode 110 | — |
|  |  | Treatment time Minute | 40 | 40 | 1 | 1 | 1 | 1 | 2 | 3 | — |
| Birefringence index | $\Delta_n$ MDA | ×10$^{-3}$ | 0.053 | 0.202 | 0.021 | 0.071 | 0.081 | 0.030 | 0.073 | 0.060 | 0.170 |
|  | $\Delta_n$ MDB | ×10$^{-3}$ | 0.043 | 0.193 | 0.007 | 0.011 | 0.071 | 0.020 | 0.006 | 0.040 | 0.044 |
|  | $\Delta_n$ MDC | ×10$^{-3}$ | 0.036 | 0.122 | 0.061 | 0.044 | 0.098 | 0.014 | 0.033 | 0.048 | 0.080 |
|  | $\Delta_n$ TDA | ×10$^{-3}$ | 0.075 | 0.038 | 0.066 | 0.046 | 0.078 | 0.034 | 0.059 | 0.038 | 0.089 |
|  | $\Delta_n$ TDB | ×10$^{-3}$ | 0.062 | 0.027 | 0.062 | 0.033 | 0.062 | 0.026 | 0.047 | 0.034 | 0.064 |
|  | $\Delta_n$ TDC | ×10$^{-3}$ | 0.056 | 0.008 | 0.034 | 0.024 | 0.031 | 0.010 | 0.020 | 0.046 | 0.003 |
|  | $\Delta_n$MDMAX | ×10$^{-3}$ | 0.016 | 0.080 | 0.054 | 0.033 | 0.027 | 0.016 | 0.039 | 0.011 | 0.090 |
|  | $\Delta_n$TDMAX | ×10$^{-3}$ | 0.019 | 0.029 | 0.032 | 0.021 | 0.047 | 0.024 | 0.038 | 0.012 | 0.086 |
|  | $\Delta_n$MDMAX + $\Delta_n$TDMAX | ×10$^{-3}$ | 0.035 | 0.109 | 0.087 | 0.054 | 0.075 | 0.040 | 0.078 | 0.024 | 0.176 |
| Protrusion from end part (vacuum bag) | MD direction | mm | −0.20 | −0.20 | −0.20 | −0.10 | −0.20 | 0.00 | −0.20 | −0.30 | −0.30 |
|  | TD direction | mm | 0.10 | 0.10 | 0.10 | 0.00 | 0.00 | 0.10 | 0.10 | 0.20 | 0.10 |

EXPLANATION OF SYMBOLS

1: First layer
1a: First surface
1b: Second surface
2: Second layer
2a: Outer surface
3: Third layer
3a: Outer surface
11: Interlayer film
11A: Interlayer film (First layer)
11a: First surface
11b: Second surface
21: First lamination glass member
22: Second lamination glass member
31: Laminated glass
31A: Laminated glass

The invention claimed is:

1. An interlayer film for laminated glass arranged between a first lamination glass member and a second lamination glass member to obtain laminated glass,
the interlayer film only having a one-layer structure,
the interlayer film containing a thermoplastic resin, a plasticizer, and a heat shielding compound, a content of the plasticizer in the interlayer film being 20 parts by weight or more and 50 parts by weight or less relative to 100 parts by weight of the thermoplastic resin in the interlayer film,
the interlayer film having an MD direction and a TD direction,
the interlayer film having a first surface part at one side in a thickness direction, a second surface part at the other side in the thickness direction, and a center part between the first surface part and the second surface part,
when, in the MD direction of the interlayer film, a birefringence index of the first surface part, a birefringence index of the second surface part, and a birefringence index of the center part are defined as ΔnMDA, ΔnMDB, and ΔnMDC, respectively, ΔnMDA, ΔnMDB, and ΔnMDC each being 0.25×10$^{-3}$ or less,
the thermoplastic resin being a polyvinyl acetal resin,
the plasticizer comprising at least one selected from the group consisting of triethylene glycol di-2-ethyl-hexanoate and triethylene glycol di-2-ethylbutyrate, and
the heat shielding compound comprising at least one selected from the group consisting of an antimony-doped tin oxide particle, a tin-doped indium oxide particle and a tungsten oxide particle, a content of the heat shielding particle being 0.01% by weight or more and 3% by weight or less in 100% by weight of the interlayer film.

2. The interlayer film for laminated glass according to claim 1, wherein ΔnMDA, ΔnMDB, and ΔnMDC each 0.019×10$^{-3}$ or more and 0.25×10$^{-3}$ or less.

3. The interlayer film for laminated glass according to claim 1, wherein, in the TD direction of the interlayer film, when a birefringence index of the first surface part, a birefringence index of the second surface part, and a birefringence index of the center part are defined as ΔnTDA, ΔnTDB, and ΔnTDC, respectively, ΔnTDA, ΔnTDB, and ΔnTDC each are 0.018×10$^{-3}$ or more.

4. The interlayer film for laminated glass according to claim 1, wherein the glass transition temperature of the interlayer film is 35° C. or less or the content of the plasticizer in the interlayer film is 35 parts by weight or more and 50 parts by weight or less relative to 100 parts by weight of the thermoplastic resin in the interlayer film.

5. The interlayer film for laminated glass according to claim 4, wherein the glass transition temperature of the interlayer film is 35° C. or less.

6. The interlayer film for laminated glass according to claim 4, wherein the content of the plasticizer in the interlayer film is 35 parts by weight or more and 50 parts by weight or less relative to 100 parts by weight of the thermoplastic resin in the interlayer film.

7. The interlayer film for laminated glass according to claim 4, wherein the glass transition temperature of the interlayer film is 35° C. or less and the content of the plasticizer in the interlayer film is 35 parts by weight or more and 50 parts by weight or less relative to 100 parts by weight of the thermoplastic resin in the interlayer film.

8. The interlayer film for laminated glass according to claim 1, being arranged between a first lamination glass member and a second lamination glass member and then made to pass through a gap between two heated rolls to obtain laminated glass.

9. The interlayer film for laminated glass according to claim 1, being arranged between a first glass plate and a second glass plate to obtain laminated glass.

10. The interlayer film for laminated glass according to claim 1, being a melt-extrusion molded product.

11. A laminated glass, comprising:
a first lamination glass member;
a second lamination glass member; and
the interlayer film for laminated glass according to claim 1,
the interlayer film for laminated glass being arranged between the first lamination glass member and the second lamination glass member.

12. The interlayer film for laminated glass according to claim 1, further comprising an Ingredient X, the Ingredient X being at least one selected from the group consisting of a phthalocyanine compound, a naphthalocyanine compound, and an anthracyanine compound.

13. The interlayer film for laminated glass according to claim 12, wherein, a content of the Ingredient X is greater than or equal to 0.001% by weight, and less than or equal to 0.2% by weight in 100% by weight of the interlayer film.

14. The interlayer film for laminated glass according to claim 1, wherein the thermoplastic resin is a polyvinyl butyral resin.

15. The interlayer film for laminated glass according to claim wherein the plasticizer is triethylene glycol di-2-ethylhexanoate.

16. The interlayer film for laminated glass according to claim 1, wherein, the content of the plasticizer in the interlayer film is 30 parts by weight or more and 40 parts by weight or less relative to 100 parts by weight of the thermoplastic resin in the interlayer film.

17. The interlayer film for laminated glass according to claim 1,
wherein, the content of the plasticizer in the interlayer film is 30 parts by weight or more and 40 parts by weight or less relative to 100 parts by weight of the thermoplastic resin in the interlayer film,
the thermoplastic resin is a polyvinyl butyral resin, and
the plasticizer is triethylene glycol di-2-ethylhexanoate.

18. The interlayer film for laminated glass according to claim 1, further comprising a sulfur-based oxidation inhibitor.

19. The interlayer film for laminated glass according to claim 1, further comprising a coupling agent containing at least one selected from the group consisting of silicon, aluminum, and titanium.

\* \* \* \* \*